US012750478B2

(12) United States Patent
Wang et al.

(10) Patent No.: US 12,750,478 B2
(45) Date of Patent: Sep. 29, 2026

(54) FILTERING APPLIED TO PREDICTION IN VIDEO CODING

(71) Applicant: QUALCOMM Incorporated, San Diego, CA (US)

(72) Inventors: Hongtao Wang, San Diego, CA (US); Bappaditya Ray, San Diego, CA (US); Chun-Chi Chen, San Diego, CA (US); Vadim Seregin, San Diego, CA (US); Marta Karczewicz, San Diego, CA (US); Muhammed Zeyd Coban, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 106 days.

(21) Appl. No.: 18/404,658

(22) Filed: Jan. 4, 2024

(65) Prior Publication Data

US 2024/0236314 A1 Jul. 11, 2024

Related U.S. Application Data

(60) Provisional application No. 63/478,657, filed on Jan. 5, 2023, provisional application No. 63/496,278, filed (Continued)

(51) Int. Cl.
*H04N 19/177* (2014.01)
*H04N 19/105* (2014.01)
(Continued)

(52) U.S. Cl.
CPC ......... *H04N 19/117* (2014.11); *H04N 19/105* (2014.11); *H04N 19/159* (2014.11); *H04N 19/176* (2014.11); *H04N 19/521* (2014.11)

(58) Field of Classification Search
CPC ............... H04N 19/117; H04N 19/105; H04N 19/159; H04N 19/176; H04N 19/521; H04N 19/593; H04N 19/82
See application file for complete search history.

(56) References Cited

U.S. PATENT DOCUMENTS

2011/0286520 A1* 11/2011 Xu ......................... H04N 19/70 375/E7.243
2023/0370586 A1* 11/2023 Kim ..................... H04N 19/159
2025/0030888 A1* 1/2025 Ray ...................... H04N 19/176

FOREIGN PATENT DOCUMENTS

CN 110166773 A 8/2019
WO 2022253320 A1 12/2022

OTHER PUBLICATIONS

Astola P., et al., "EE2-1.1a: Convolutional Cross-component Intra Prediction Model," JVET-AA0057-v1, Joint Video Experts Team (JVET) of ITU-T SG 16 WP 3 and ISO/IEC JTC 1/SC 29, 27th Meeting, by Teleconference, Jul. 13-22, 2022, pp. 1-4.

(Continued)

*Primary Examiner* — Richard T Torrente
(74) *Attorney, Agent, or Firm* — Shumaker & Sieffert, P.A.

(57) ABSTRACT

A video decoder may be configured to determine a reference block for a current block of a current picture of video data, wherein the reference block is in the current picture; determine a prediction block based on the reference block; determine whether to apply filtering to the prediction block; based on determining that the filtering is to be applied to the prediction block, compare a template of the reference block to a template of the current block and filter the prediction block based on the comparing of the template of the reference block to the template of the current block to determine a filtered prediction block; decode the current block based on the filtered prediction block to determine a decoded (Continued)

version of the current block; and output a decoded picture of the video data comprising the decoded version of the current block.

26 Claims, 16 Drawing Sheets

Related U.S. Application Data on Apr. 14, 2023, provisional application No. 63/509,207, filed on Jun. 20, 2023, provisional application No. 63/511,134, filed on Jun. 29, 2023.

(51) Int. Cl.
*H04N 19/117* (2014.01)
*H04N 19/159* (2014.01)
*H04N 19/176* (2014.01)
*H04N 19/513* (2014.01)

(56) References Cited

OTHER PUBLICATIONS

Bross B., et al., "Versatile Video Coding (Draft 10)," Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Version 17, Sep. 4, 2020, XP030293002, 548 Pages.
Chen C.C., et al., "EE2-1.8/1.9: IBC Adaptation for Coding of Natural Content," JVET-AD0208-v2, Joint Video Experts Team (JVET) of ITU-T SG 16 WP 3 and ISO/IEC JTC 1/SC 29 30th Meeting, Antalya, Apr. 21-28, 2023, pp. 1-4.
Chen W., et al., "Non-EE2: IBC With Fractional Block Vectors," JVET-AC0172-v3, Joint Video Experts Team (JVET) of ITU-T SG 16 WP 3 and ISO/IEC JTC 1/SC 29 29th Meeting, by Teleconference, Jan. 11-20, 2023, pp. 1-3.
Coban M., et al., "Algorithm Description of Enhanced Compression Model 7 (ECM 7)," JVET-AB2025, Joint Video Experts Team (JVET) of ITU-T SG 16 WP 3 and ISO/IEC JTC 1/SC 29, 28th Meeting, Mainz, DE, Oct. 20-28, 2022, 62 Pages, Dec. 22, 2022, XP030306363, paragraphs 3.1.5.1, 3.3.5, 03.4, paragraphs [3.1.14], 3.2.16-0020, figure 14.
Coban M., et al., "Algorithm Description of Enhanced Compression Model 8 (ECM 8)," JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74.
Coban M., et al., "Algorithm Description of Enhanced Compression Model 9 (ECM 9)," JVET-AD2025, Joint Video Experts Team (JVET) of ITU-T SG 16 WP 3 and ISO/IEC JTC 1/SC 29 30th Meeting, Antalya, TR, Apr. 21-28, 2023, pp. 1-76.
Garus P., et al., "EE2-related: InterMTS for IBC and IntraTMP," JVET-AD0200-v2, Joint Video Experts Team (JVET) of ITU-T SG 16 WP 3 and ISO/IEC JTC 1/SC 29 30th Meeting, Antalya, TR, Apr. 21-28, 2023, pp. 1-3.
Huo J., et al., "EE2-1.15a: Intra Template Matching (Intra TMP) Based on Linear Filter Model," Xidian University, JVET-AD0112-v3, Joint Video Experts Team (JVET) of ITU-T SG 16 WP 3 and ISO/IEC JTC 1/SC 29 30th Meeting, Antalya, TR, Apr. 21-28, 2023, pp. 1-3.
Huo J., et al., "Non-EE2: Intra Template Matching (Intra TMP) Based on Linear Filter Model," Joint Video Experts Team (JVET) of ITU-T SG 16 WP 3 and ISO/IEC JTC 1/SC 29, JVET-AC0109-v1, 29th Meeting, by Teleconference, Jan. 11, 2023-Jan. 20, 2023, No. JVET-AC0109, m61687, Jan. 4, 2023, 3 Pages, XP030306641, Section 2.
International Search Report and Written Opinion—PCT/US2024/010429—ISA/EPO—Mar. 6, 2024 16 Pages.
ITU-T H.265: "Series H: Audiovisual and Multimedia Systems Infrastructure of Audiovisual Services—Coding of Moving Video," High Efficiency Video Coding, the International Telecommunication Union, Jun. 2019, 696 Pages.
ITU-T H.266: "Series H: Audiovisual and Multimedia Systems Infrastructure of Audiovisual Services—Coding of Moving Video," Versatile Video Coding, the International Telecommunication Union, Aug. 2020, 516 pages.
Jhu H-J., et al., (KWAI): "EE2-2.5: Filtered Intra Block Copy (FIBC)," Joint Video Experts Team (JVET) of ITU-T SG 16 WP 3 and ISO/IEC JTC 1/SC 29, JVET-AE0159-v3, 31st Meeting, Geneva, Jul. 11, 2023-Jul. 19, 2023, No. Jvet- AE0159, Jul. 12, 2023, 5 Pages, XP030311467, The Whole Document.
Jhu H.J., et al., "Non-EE2: Filtered Intra Block Copy (FIBC)," JVET-AD0217-v2, Joint Video Experts Team (JVET) of ITU-T SG 16 WP 3 and ISO/IEC JTC 1/SC 29 30th Meeting, Antalya, TR, Apr. 21-28, 2023, pp. 1-3.
Karczewicz M., et al., "Common Test Conditions and Evaluation Procedures for Enhanced Compression Tool Testing," JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.
Li X., "Crosscheck of JVET-AC0213 on SbTMVP with MMVD," JVET-AC0217, Joint Video Experts Team (JVET) of ITU-T SG 16 WP 3 and ISO/IEC JTC 1/SC 29 29th Meeting, by Teleconference, Jan. 11-20, 2023, pp. 1-2.
Liu D., "Crosscheck of JVET-AC0052 (EE1-2.4: CNN filter Based on RPR-based SR Combined with GOP Level Adaptive Resolution)," JVET-AC0223-v1, Joint Video Experts Team (JVET) of ITU-T SG 16 WP 3 and ISO/IEC JTC 1/ SC 29 29th Meeting, by teleconference, Jan. 11-20, 2023, pp. 1-2.
Ray B., et al., "Non-EE2: IBC Adaptation for Coding of Natural Content," JVET-AC0161-v4, Joint Video Experts Team (JVET) of ITU-T SG 16 WP 3 and ISO/IEC JTC 1/SC 29 29th Meeting, by teleconference, Jan. 11-20, 2023, pp. 1-4.
Ray B., et al., (QUALCOMM): "Non-EE2: Filtering for IBC Predicted Block," Joint Video Experts Team (JVET) of ITU-T SG 16 WP 3 and ISO/IEC JTC 1/SC 29, JVET-AD0223-v2, 30th Meeting, Antalya, Apr. 21, 2023-Apr. 28, 2023, No. JVET-AD0223, m62908, Apr. 22, 2023, 4 Pages, XP030309020, The Whole Document.
Seregin V., et al., "Exploration Experiment on Enhanced Compression Beyond VVC Capability (EE2)," Joint Video Experts Team (JVET) of ITU-T SG 16 WP 3 and ISO/IEC JTC 1/SC 29, JVET-AC2024-v2, 29th Meeting, by teleconference, Jan. 11-20, 2023, pp. 1-30.
Seregin V., et al., "Exploration Experiment on Enhanced Compression beyond VVC capability (EE2)," JVET-AD2024-v2, Joint Video Experts Team (JVET) of ITU-T SG 16 WP 3 and ISO/IEC JTC 1/SC 29 30th Meeting, Antalya, TR, Apr. 21-28, 2023, pp. 1-15.
Youvalari R.G., et al., "EE2-1.15b: Filtered Template Matching Based Intra Prediction," JVET-AD0099-v2, Joint Video Experts Team (JVET) of ITU-T SG 16 WP 3 and ISO/IEC JTC 1/SC 29 30th Meeting, Antalya, TR, Apr. 21-28, 2023, pp. 1-4.
Youvalari R.G., et al., (NOKIA): "AHG12: Filtered Template Matching Based Intra Prediction (FTMP)," Joint Video Experts Team (JVET) of ITU-T SG 16 WP 3 and ISO/IEC JTC 1/SC 29, JVET-AC0146-v1, 29th Meeting, by Teleconference, Jan. 11, 2023-Jan. 20, 2023, No. JVET-AC0146, m61724, Jan. 4, 2023, 4 Pages, XP030306742, Sections 1 and 2.

* cited by examiner

FILTERING APPLIED TO PREDICTION IN VIDEO CODING

This application claims the benefit of:

U.S. Provisional Patent Application No. 63/478,657, filed 5 Jan. 2023

U.S. Provisional Patent Application No. 63/496,278, filed 14 Apr. 2023,

U.S. Provisional Patent Application No. 63/509,207, filed 20 Jun. 2023,

U.S. Provisional Patent Application No. 63/511,134, filed 29 Jun. 2023, the entire content of each application being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called “smart phones,” video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure relate to prediction, including inter prediction, intra prediction, and intra-block copy (IBC) mode and, more specifically, relate to techniques for using filtering to improve the quality of prediction blocks. Unlike deblocking filtering, sample adaptive offset filtering, and adaptive loop filtering, which occur after reconstruction, the filtering techniques of this disclosure may be applied to a prediction block before reconstruction. By comparing a template of a reference block to a template of a current block and filtering the prediction block based on the comparing of the template of the reference block to the template of the current block to determine a filtered prediction block, the techniques of this disclosure may produce more accurate predictions which can result in an improved rate-distortion tradeoff. For example, by using the filtering techniques of this disclosure to produce prediction blocks that more accurately match original blocks, the amount of bits needed to send residual data may be reduced. Moreover, because the filtering is template based, filter coefficients, which can require a significant bit overhead to signal, need not be included in the bitstream.

This disclosure also describes techniques for configuring the video decoder to determine whether to apply the filtering to the prediction block based on coding scenarios and signaling overhead. These signaling techniques may, for example, minimize signaling overhead by making the filtering conditional on block size, slice type, or other such characteristics of the block.

According to an example of this disclosure, a method of decoding video data includes: determining a reference block for a current block of a current picture of video data, wherein the reference block is in the current picture; determining a prediction block based on the reference block; determining whether to apply filtering to the prediction block; based on determining that the filtering is to be applied to the prediction block: comparing a template of the reference block to a template of the current block; filtering the prediction block based on the comparing of the template of the reference block to the template of the current block to determine a filtered prediction block; decoding the current block based on the filtered prediction block to determine a decoded version of the current block; and outputting a decoded picture of the video data comprising the decoded version of the current block.

According to an example of this disclosure, a device for decoding video data includes: a memory configured to store video data; one or more processors implemented in circuitry and configured to: determine a reference block for a current block of a current picture of video data, wherein the reference block is in the current picture; determine a prediction block based on the reference block; determine whether to apply filtering to the prediction block; based on determining that the filtering is to be applied to the prediction block: compare a template of the reference block to a template of the current block; filter the prediction block based on the comparing of the template of the reference block to the template of the current block to determine a filtered prediction block; decode the current block based on the filtered prediction block to determine a decoded version of the current block; and output a decoded picture of the video data comprising the decoded version of the current block.

A computer-readable storage medium stores instructions that when executed by one or more processors cause the one or more processors to: determine a reference block for a current block of a current picture of video data, wherein the reference block is in the current picture; determine a prediction block based on the reference block; determine whether to apply filtering to the prediction block; based on determining that the filtering is to be applied to the prediction block: compare a template of the reference block to a template of the current block; filter the prediction block based on the comparing of the template of the reference block to the template of the current block to determine a filtered prediction block; decode the current block based on the filtered prediction block to determine a decoded version of the current block; and output a decoded picture of the video data comprising the decoded version of the current block.

The details of one or more examples are set forth in the accompanying drawings and the description below. Other features, objects, and advantages will be apparent from the description, drawings, and claims.

DETAILED DESCRIPTION

Figure 1:
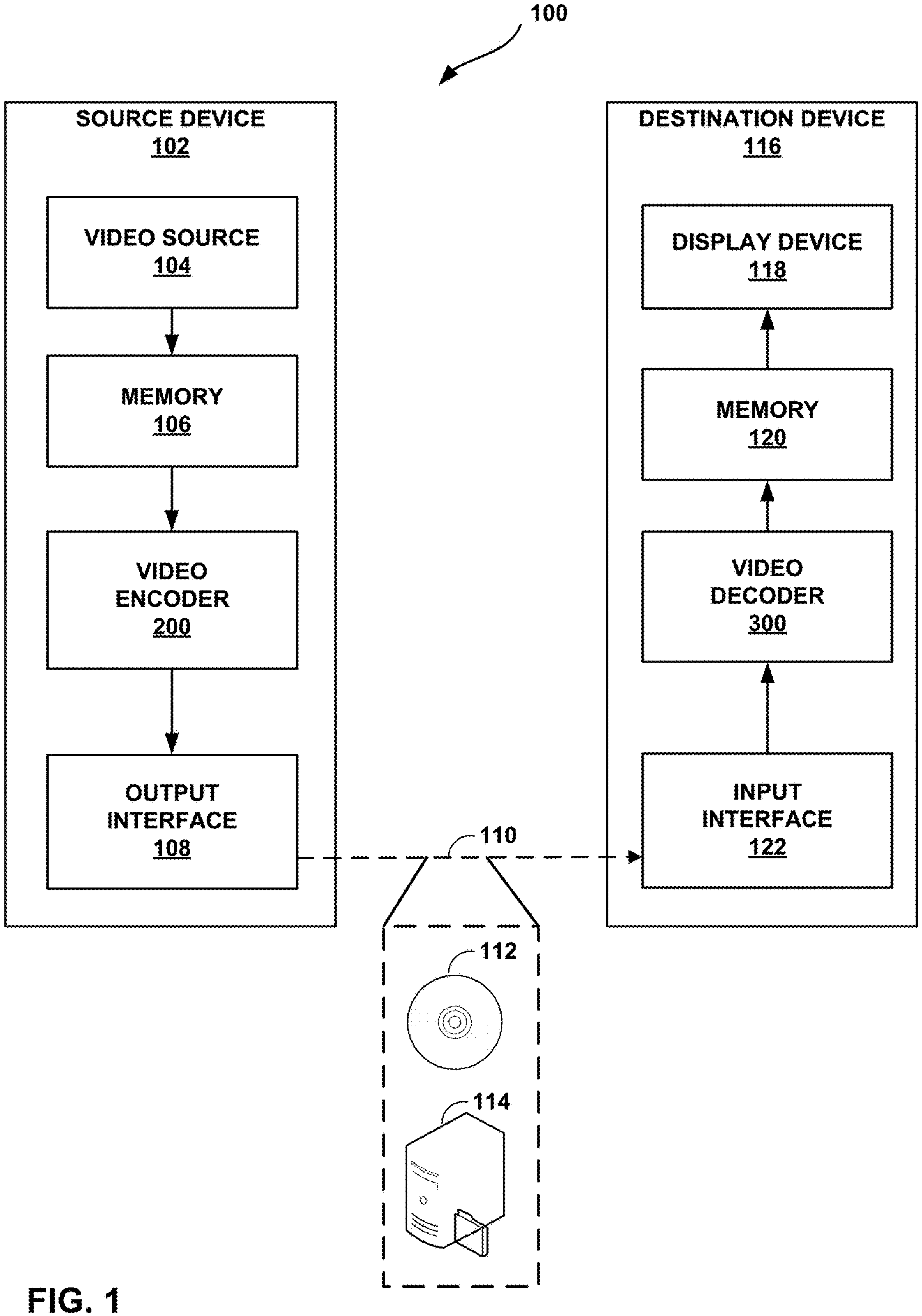
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction or intra block copy (IBC)) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure relate to prediction, including inter prediction, intra prediction, and intra-block copy (IBC) mode and, more specifically, relate to techniques for using filtering to improve the quality of prediction blocks. Unlike the deblocking filtering, SAO filtering, and ALF described above, which occur after reconstruction, this filtering may be applied to a prediction block before reconstruction. By comparing a template of a reference block to a template of a current block and filtering the prediction block based on the comparing of the template of the reference block to the template of the current block to determine a filtered prediction block, the techniques of this disclosure may produce more accurate predictions which can result in an improved rate-distortion tradeoff. For example, by using the filtering of this disclosure to produce prediction blocks that more accurately match original blocks, the amount of bits needed to send residual data may be reduced. Moreover, because the filtering is template based, filter coefficients, which can require a significant bit overhead to signal, need not be included in the bitstream.

This disclosure also describes techniques for configuring the video decoder to determine whether to apply the filtering to the prediction block based on coding scenarios and signaling overhead. These signaling techniques may, for example, minimize signaling overhead by making the filtering conditional on block size, slice type, or other such characteristics of the block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for intra block copy described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the techniques for intra block copy described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114B or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (cMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). JVET has started exploring technologies to further improve the coding performance of VVC. A test model reference software is also in development and described in J. Chen, Y. Ye, S. Kim, "Algorithm description of Enhanced Compression Model 7 (ECM 7)," 28th JVET Meeting, Mainz, DE, October 2022, JVET-AB2025. In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use intra block copy.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtrec partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUS having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

VVC includes an intra block copy (IBC) mode. IBC mode significantly improves the coding efficiency of screen content materials. IBC mode is implemented as a block level coding mode, and thus block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with adaptive motion vector resolution (AMVR), the IBC mode can switch between 1-pel and 4-pel motion vector precisions. An IBC-coded CU is treated as a third prediction mode that is different than intra or inter prediction modes. In VVC, the IBC mode is used for CUs with both width and height smaller than or equal to 64 luma samples. Multi-transform selection (MTS) and low-frequency, non-separable transform (LFNST) are disabled for an IBC coded block.

At a CU level, IBC mode is signaled with a flag and may be signaled as IBC AMVP mode or IBC skip/merge mode. In IBC skip/merge mode, a merge candidate index is used to indicate which of the block vectors in a list of neighboring candidate IBC coded blocks is used to predict the current block. The merge list includes spatial, history-based motion vector prediction (HMVP), and pairwise candidates. In IBC AMVP mode, a block vector difference is coded in the same way as a motion vector difference. The block vector prediction process uses two candidates as predictors, one from a left neighbor and one from an above neighbor (if IBC coded). When either neighbor is not available, a default block vector may be used as a predictor. A flag is signaled to indicate the block vector predictor index.

To reduce memory consumption and decoder complexity, IBC mode in VVC allows only the reconstructed portion of the predefined area including the region of current CTU and some region of the left CTU.

FIGS. 2A-2D show examples of reference regions for IBC Mode, where each block represents a 64×64 luma sample unit. In the examples of FIGS. 2A-2D, current block 130 represents a block currently being coded. Blocks 132 represent already-coded blocks that are available for predicting block 130 using IBC. Blocks 134 represent already-coded blocks that are not available for predicting block 130. Blocks 136 represent not-yet-coded blocks that are not available for predicting block 130.

Depending on the location of the current coding CU location within the current CTU, different blocks may be available for IBC. If a current block falls into the top-left 64×64 block of the current CTU, as in FIG. 2A, then in addition to the already reconstructed samples in the current CTU, the current CTU may also be predicted using the reference samples in the bottom-right 64×64 blocks of the left CTU, using current picture referencing (CPR) mode. The current block may also be predicted using the reference samples in the bottom-left 64×64 block of the left CTU and the reference samples in the top-right 64×64 block of the left CTU, using CPR mode.

Figure 2A:
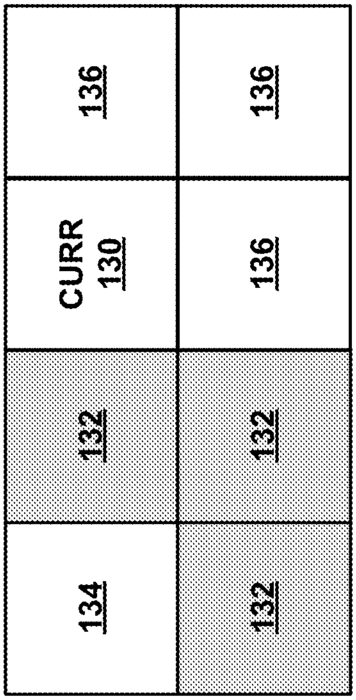
FIGS. 2A-2D illustrate reference regions for intra block copy (IBC) mode.
Figure 2B:
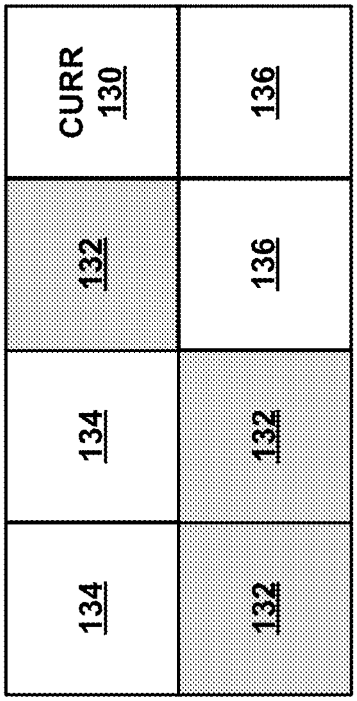

If a current block falls into the top-right 64×64 block of the current CTU, as in FIG. 2B, then in addition to the already reconstructed samples in the current CTU, if luma location (0, 64) relative to the current CTU has not yet been reconstructed, the current block may also be predicted using the reference samples in the bottom-left 64×64 block and bottom-right 64×64 block of the left CTU, using CPR mode. Otherwise, the current block may be predicted using reference samples in bottom-right 64×64 block of the left CTU.

Figure 2C:
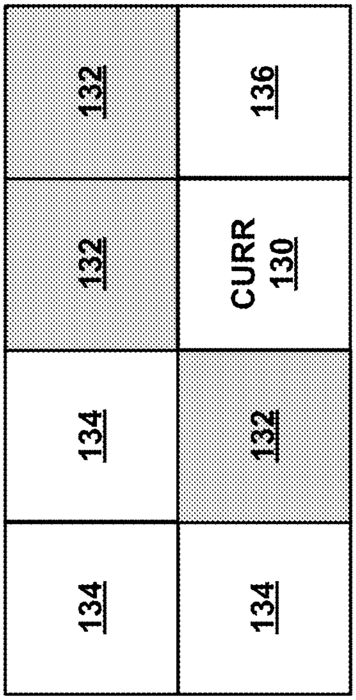
Figure 2D:
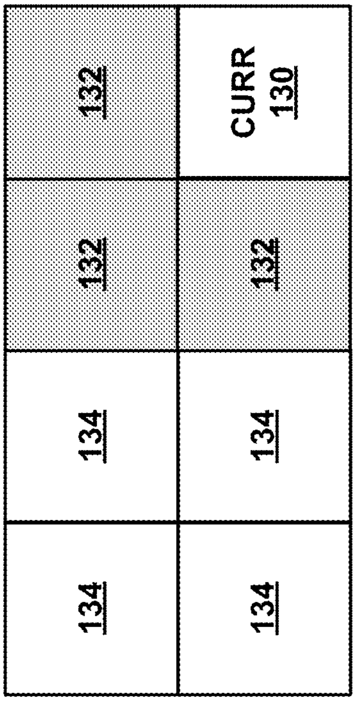

If a current block falls into the bottom-left 64×64 block of the current CTU, as in FIG. 2C, then in addition to the already reconstructed samples in the current CTU, if luma location (64, 0) relative to the current CTU has not yet been reconstructed, the current block may be predicted using the reference samples in the top-right 64×64 block and bottom-right 64×64 block of the left CTU, using CPR mode. Otherwise, the current block may also be predicted using the reference samples in the bottom-right 64×64 block of the left CTU, using CPR mode. If a current block falls into the bottom-right 64×64 block of the current CTU, as in FIG. 2D, the current block may be predicted using only the already reconstructed samples in the current CTU, using CPR mode.

There are several improvements of the IBC tool in the current ECM relative to VVC, mainly targeting improvement for screen content. For example, ECM includes IBC with template matching (TM-IBC). Template Matching is used in IBC for both IBC merge mode and IBC AMVP mode.

The IBC-TM merge list is modified compared to the one used by regular IBC merge mode such that the candidates are selected according to a pruning process with a motion distance between the candidates as in the regular TM merge mode. The ending zero motion fulfillment is replaced by motion vectors to the left (−W, 0), top (0, −H) and top-left (−W, −H), where W is the width and H the height of the current CU.

In the IBC-TM merge mode, the selected candidates are refined with the Template Matching process prior to the rate-distortion optimization (RDO) or decoding process. The IBC-TM merge mode has been put in competition with the regular IBC merge mode and a TM-merge flag is signaled.

In the IBC-TM AMVP mode, up to three candidates are selected from the IBC-TM merge list. Each of those three selected candidates are refined using the template matching process and sorted according to their resulting template matching cost. In some examples, only the first two, after the sorting, are then considered in the motion estimation process as usual.

In the template matching refinement for both IBC-TM merge and AMVP modes, IBC motion vectors are constrained (i) to be integer and (ii) within a reference region as shown in FIGS. 2A-2D. So, in IBC-TM merge mode, some or all refinements may be performed at integer precision, and in IBC-TM AMVP mode, refinements may be performed either at integer or 4-pel precision depending on the AMVR value. Such a refinement accesses only samples without interpolation. In both cases, the refined motion vectors and the used template in each refinement step must respect the constraint of the reference region.

Figure 3:
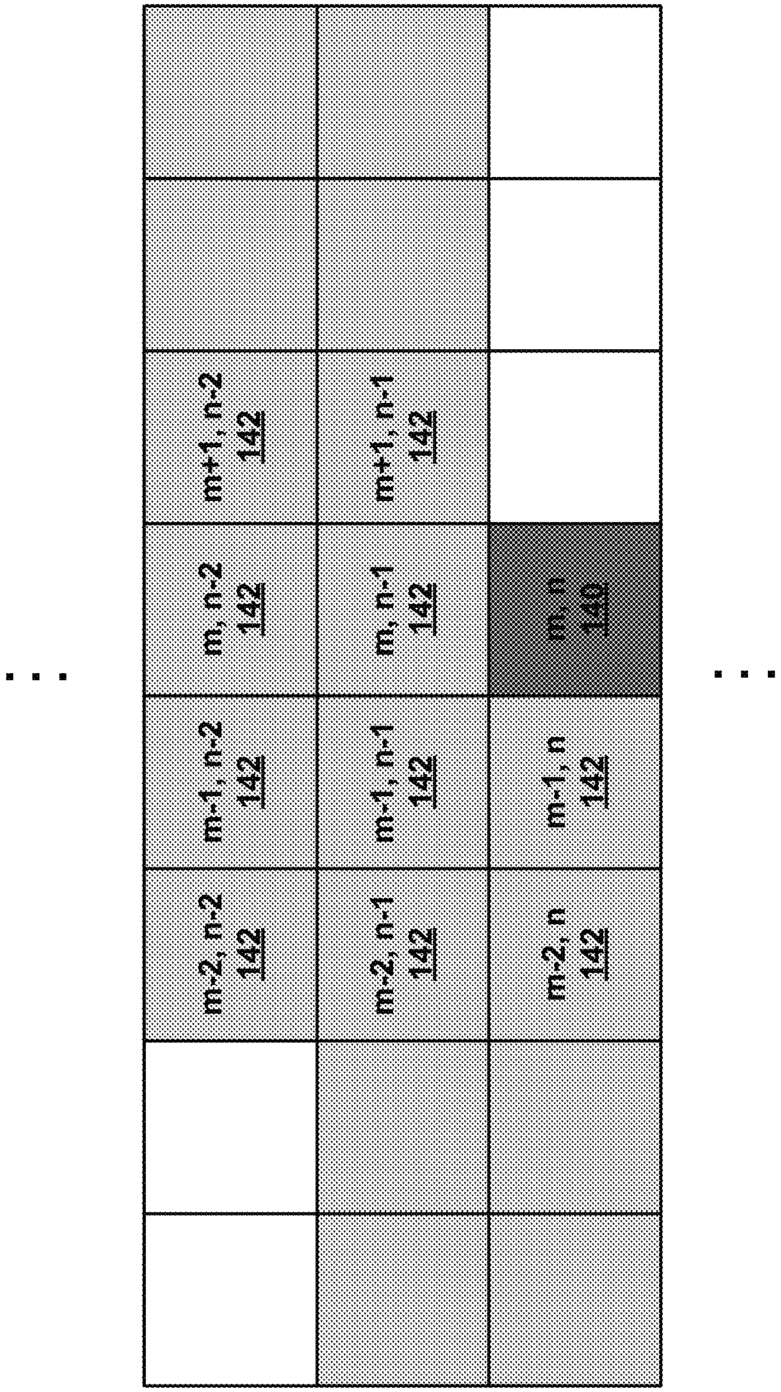
FIG. 3 illustrates an example of a reference area for coding a coding tree unit.

IBC in ECM includes a reference area increase relative to VVC. The reference area for IBC is extended to two CTU rows above. FIG. 3 shows the reference area for coding CTU 140, located at (m, n). Specifically, for CTU 140 to be coded, the reference area includes CTUs 142, with index (m−2, n−2) . . . (W, n−2),(0, n−1) . . . (W, n−1),(0, n) . . . (m, n), where W denotes the maximum horizontal index within the current tile, slice or picture. When a CTU size is 256, the reference area is limited to one CTU row above. This setting ensures that for CTU size being 128B or 256, IBC does not require extra memory in the current ETM platform. The per-sample block vector search (or called local search) range is limited to [−(C<<1), C>>2] horizontally and [−C, C>>2] vertically to adapt to the reference area extension, where C denotes the CTU size.

ECM also includes a reconstruction reordered IBC (RR-IBC). RR-IBC mode is allowed for IBC coded blocks. When RR-IBC is applied, the samples in a reconstruction block are flipped according to a flip type of the current block. At the encoder side, the original block is flipped before motion search and residual calculation, while the prediction block is derived without flipping. At the decoder side, the reconstruction block is flipped back to restore the original block.

Two flip processes, horizontal flip and vertical flip, are supported for RR-IBC coded blocks. A syntax flag is initially signaled for an IBC AMVP coded block, indicating whether the reconstruction is flipped, and if flipped, another flag is further signaled specifying the flip type. For IBC merge, the flip type is inherited from neighboring blocks, without syntax signaling. Considering the horizontal or vertical symmetry, the current block and the reference block are normally aligned horizontally or vertically. Therefore, when a horizontal flip is applied, the vertical component of the BV is not signaled and inferred to be equal to 0. Similarly, the horizontal component of the BV is not signaled and inferred to be equal to 0 when a vertical flip is applied.

Figure 4A:
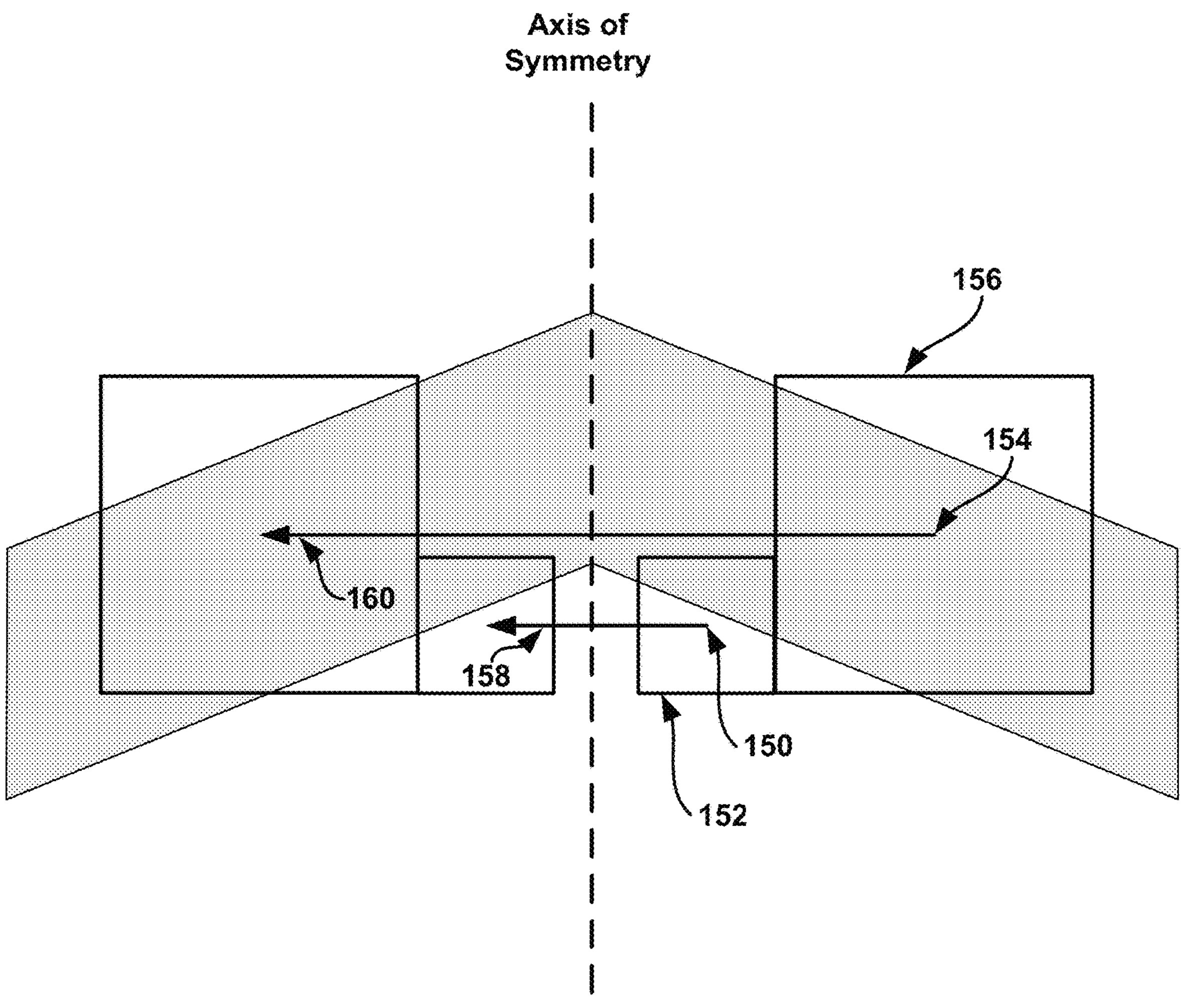
FIGS. 4A and 4B show examples of BV adjustments for a horizontal flip and a vertical flip, respectively.
Figure 4B:
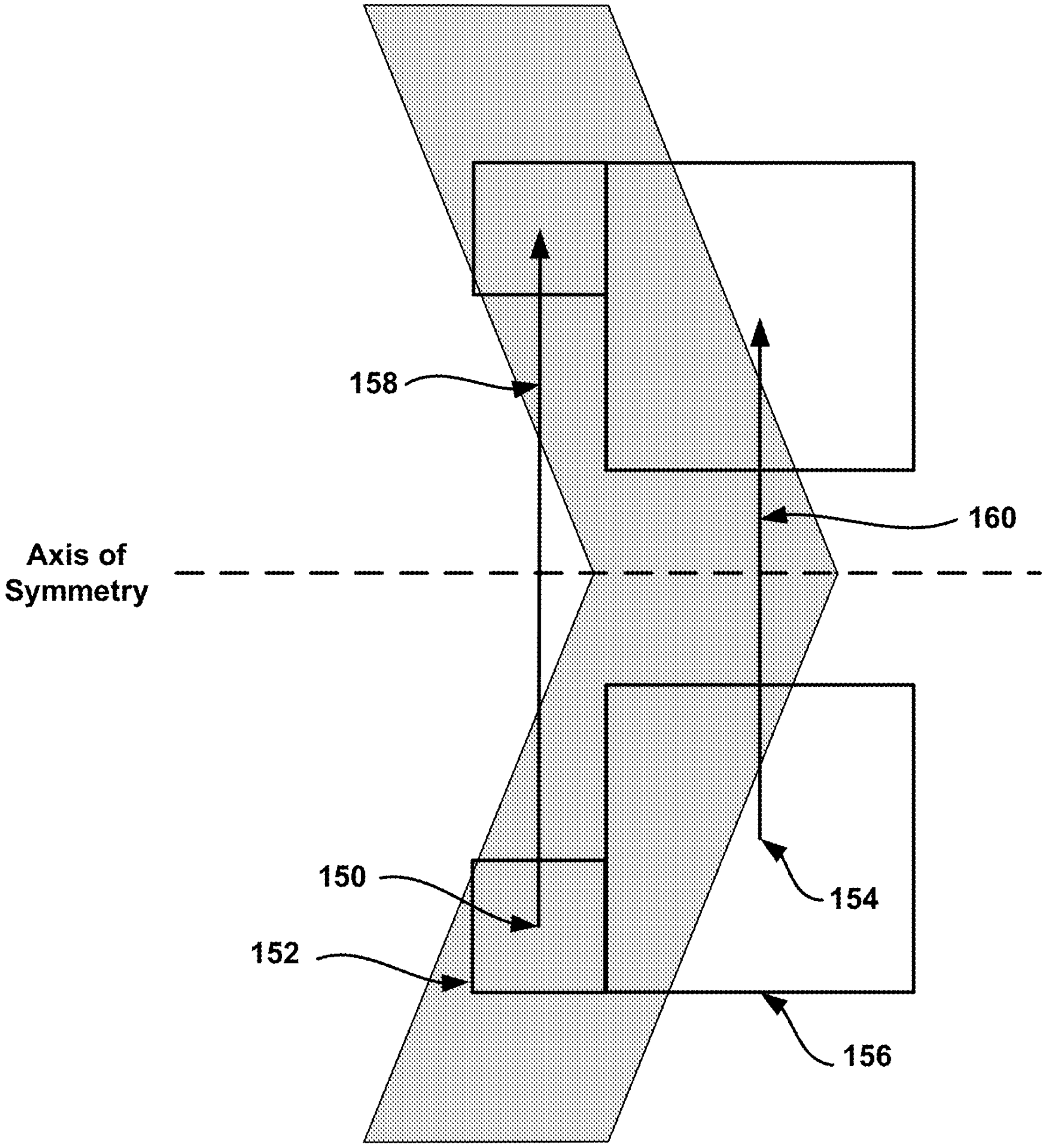

To better utilize the symmetry property, a flip-aware BV adjustment approach is applied to refine the block vector candidate. FIG. 4A shows an example of a horizontal flip, and FIG. 4B shows an example of a vertical flip. In the examples of FIGS. 4A and 4B, $(x_{nbr}, y_{nbr})$ represents the coordinates of the center sample 150 of the neighboring block 152, and $(x_{cur}, y_{cur})$ represents the coordinates of center sample 154 of current block 156. $BV^{nbr}$ denotes BV 158 of neighboring block 152, and $BV^{cur}$ denotes BV 160 of the current block 156, respectively. Instead of directly inheriting BV 158 from neighboring block 152, the horizontal component of $BV^{cur}$ is calculated by adding a motion shift to the horizontal component of $BV^{mbr}$ (denoted as $BV^{mbr}{}_h$) in case that neighboring block 152 is coded with a horizontal flip, i.e., $BV^{cur}{}_h=2(x_{nbr}-x_{cur})+BV^{nbr}{}_h$. Similarly, the vertical component of $BV^{cur}$ is calculated by adding a motion shift to the vertical component of $BV^{nbr}$ (denoted as $BV^{nbr}{}_v$) in case that the neighboring block is coded with a vertical flip, i.e., $BV^{cur}{}_v=2(y_{nbr}-y_{cur})+BV^{nbr}{}_v$.

It is to be noted that, in one example of ECM, there is no way to deactivate RR-IBC or template matching IBC in a selective manner when IBC is enabled, i.e., when IBC is enabled from SPS, these tools are automatically enabled.

Video encoder 200 and video decoder 300 may be configured to perform local illumination compensation (LIC). In ECM-7.0, LIC is an inter prediction technique to model local illumination variation between current block and its prediction block as a function of that between current block template and reference block template. The linear function that LIC applied on reference block may be described as:

$$predVal = \alpha * RefSample + \beta,$$

where 'predVal' is the output of LIC operation and α and β are 2 parameters that encoder and decoder derive from the template of the current block and the inter reference block.

LIC has also been proposed for IBC, which is an extension of the LIC used for regular inter-prediction. LIC compensates for the difference of local illumination using a scale factor and offset. The scale factor and offset are estimated from the surrounding template of the current block and surrounding template of the reference block, so additional signaling may not be needed for these parameters.

Video encoder 200 and video decoder 300 may be configured to perform intra template matching (IntraTMP). IntraTMP is a special intra prediction mode that copies the best prediction block from the reconstructed part of the current frame. The block vector (BV) from the current block to the reference block is derived by performing template matching in a predefined search range. The block that has the most similar template to the template of the current block is selected. The same template matching search operation is performed at both encoder and decoder side so that the block vector (BV) does not need to be signaled.

There are also some investigations on the usage of fractional pixel interpolation for IBC, which is reported to improve the performance of IBC. Sub-pel accuracy of ½ pel and ¼ pel is added to exercise fractional pel block vector. The interpolation filter of 12 tap or 8 tap filters may be used for interpolation. When an interpolation process requires pixels outside the IBC reference region, the reference area may be padded using only pixels available inside reference area.

As IBC uses the reconstructed part of the current picture to find a block predictor for the current block, the similarity between the current block and the prediction block may be lower than the case of inter prediction. Applying filtering to the prediction block may improve the quality of the predictor.

Meanwhile, template matching based techniques may make use of the similarity between the current block and template(s) in reconstructed areas to determine an optimal configuration of the filtering.

This disclosure describes techniques for applying filtering to the predictor block in IBC mode, inter prediction, or intra prediction. Examples of inter prediction modes are merge mode, AMVP mode, affine mode, etc.

As an example, video encoder 200 and video decoder 300 may be configured to derive the filtering process from templates associated with the current block and the reference block, which may be located in the same picture or other reference pictures.

Figure 5A:
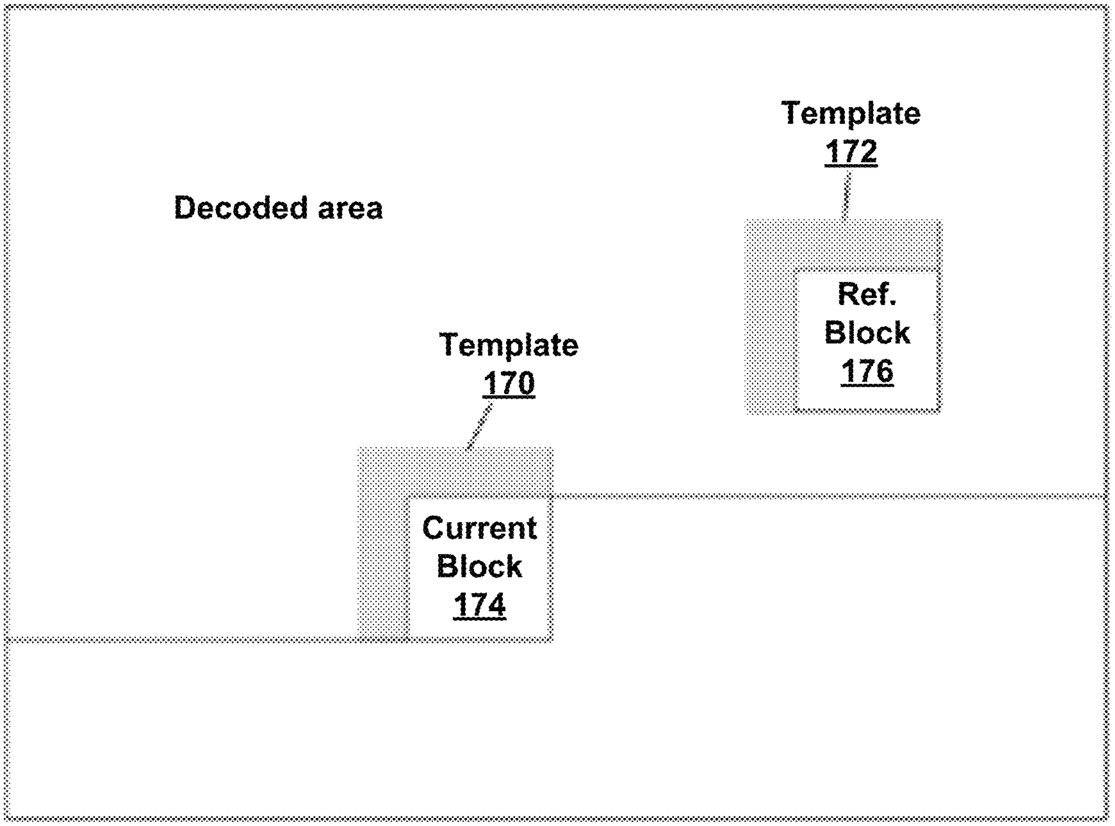
FIGS. 5A and 5B show examples of templates that may be used in conjunction with the techniques of this disclosure.

FIG. 5A shows an example of templates 170 and 172, which have an L-shape and are adjacent to current block 174 and reference block 176, respectively. Templates 170 and 172 are located in the 'decoded area' so that the values of the samples in the templates are available when current block 174 is decoded. As shown in FIG. 5A, for IBC, reference block 176 is located in the same picture as current block 174.

Figure 5B:
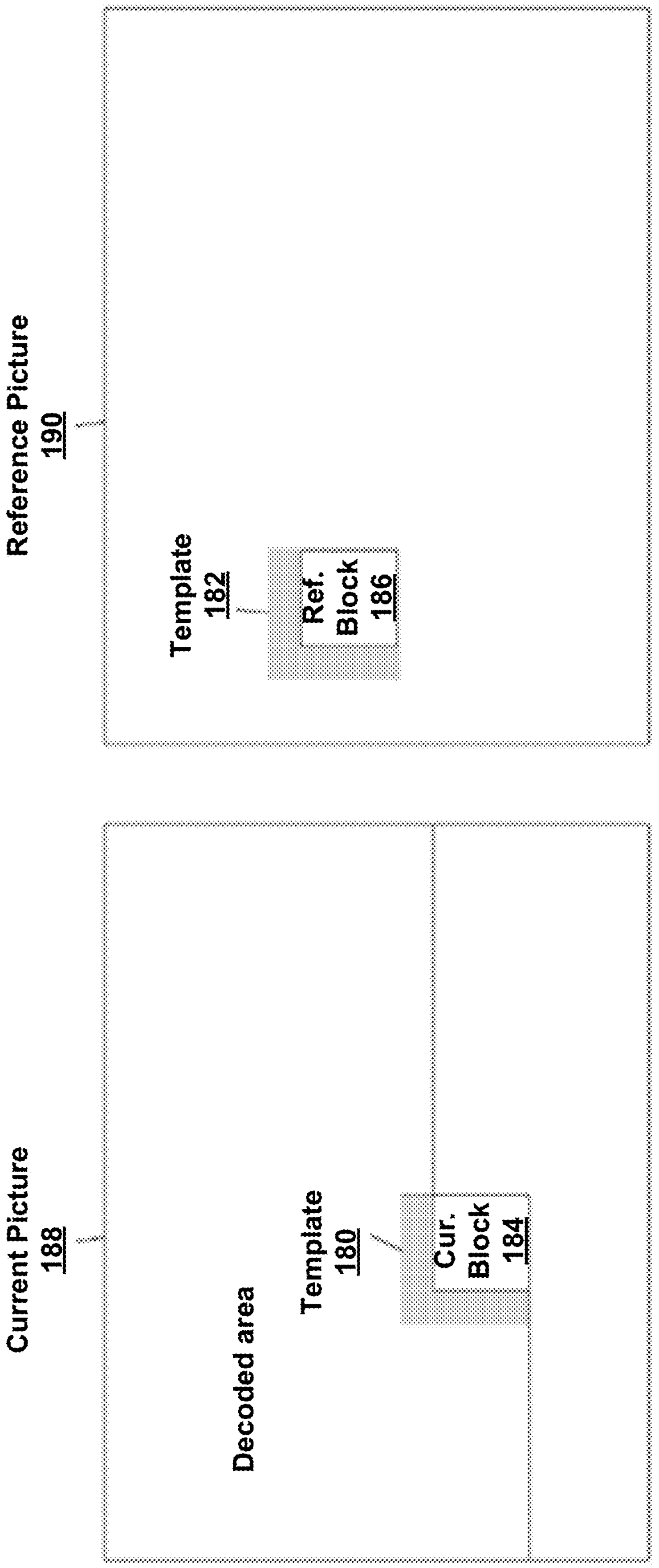

FIG. 5B shows an example of templates 180 and 182, which have an L-shape and are adjacent to current block 184 and reference block 186, respectively. Template 180 is located in the 'decoded area' of current picture 188 so that the values of the samples for template 180 are available when current block 184 is decoded. As shown in FIG. 5B, for inter prediction, reference block 186 is located in reference picture 190 instead of current picture 188.

For intra coding, there are no reference samples as there are only reconstructed neighboring samples. The derived samples may be used as reference block samples in the description. In one example, the derived samples may be samples derived applying intra prediction to the neighboring samples. Then the filter model may be derived by comparing how close the reconstructed neighboring and derived samples are. Model derivation in one example may be to minimize the difference between reconstructed and derived samples.

In some examples, the filtering process (e.g., number of parameters N, the set of samples/values used as input for each target sample) may be predefined or derived from syntax element(s) signaled in the bit-stream. The number of parameters or the filter length may depend on one or more block characteristics, including how diverse the samples in the block (e.g., variance), block size, block or motion vector magnitude, and others.

In some examples, a 6-tap filter with 5 samples and a constant bias as input may be applied to the predictor:

$$predVal = c_0C + c_1N + c_2S + c_3W + c_4E + c_5b,$$

where predVal is the output of the filtering process for a sample and C, corresponds to the input sample that collocated with the target output sample (referred to as 'collocated sample'). N, S, W, and E represent the north(upper), south(lower), west (left), cast (right) neighbor of the collocated sample. 'b' is a constant, which, in some examples, may be the sample value that locates in the middle of the range of sample values (e.g., 512 for 10-bit range [0-1023]).

In some examples, a second order term may be added to make predVal be a 7-tap filter, as follows:

$$PredVal = c_{-1}C^2 + c_0C + c_1N + c_2S + c_3W + c_4E + c_5b.$$

In some examples, the parameters that are used in the filtering process are determined by minimizing the difference between the template of the current block and result of applying the filtering process to the template area of the reference block. In one example, the minimization criteria may be the mean square error (MSE).

In some examples, certain constraints may be imposed to the function of predVal to reduce the solution space. In some examples, coefficients of predVal may be optimized subject to $c_1=c_2=c_3=c_4=0$. In some examples, the coefficients may be optimized subject to $c_1=c_2=0$. In some examples, the coefficients may be optimized subject to $c_3=c_4=0$.

In some examples, "L-shape" template of the current block located in reconstructed area with M rows and N columns (e.g., M=N=4) of samples is used to derive the filtering parameters. The parameters of the filtering process are derived by minimizing the MSE between the L-shape template of the current block and the filtered L-shape template of the IBC predictor block.

One example of the template shape may be using only left template, or only above template or another other template defined for the neighboring area.

In some examples, the on/off of the proposed filtering process for prediction may be controlled by a block level flag. As another example, the on/off of the proposed filtering process for prediction may be derived based on the information related to the current block, e.g., block size, block shape, the errors between the template of the current block and the template of the reference block before and/or after the filtering process. In some examples, the block level flag need not be signaled and may be determined based on the TM cost (The error between the template of the current block and the template of a reference block/reference block candidate) of filtered templates and that of un-filtered templates. The flag value is set equal to 1 only when the former achieves lower TM cost; otherwise, the flag value is set equal to 0. In yet another example, the flag value is set equal to 1 only when the TM cost of the former plus a positive delta term is still lower than the TM cost of the un-filtered templates; otherwise, the flag value is set equal to 0. The delta term is, for example, set equal to $2^{bitdepth-2}$ times the number of samples on the templates of the current block. For example, the number of samples is N and the bit-depth of template samples is BD, and the delta term is set equal to $N*2^{BD-2}$.

As an example of the prediction filtering, LIC may be applied to prediction blocks, in one example for the prediction of the blocks coded with Intra TMP mode. All examples in this document that derive filter parameters may be used to derive the LIC parameters. The application of LIC on top of an Intra TMP predicted block may be controlled by a block level flag. In some examples, the application of LIC on top of an Intra TMP predicted block may also be implicitly determined (without explicit signaling) depending on the predicted block characteristics and/or template characteristics or block size or shape.

In another example, various filtering modes applied to prediction, for example derived with different number of parameters or different processes, e.g. LIC, may be introduced and mode selection may be signaled or implicitly derived, in one example the implicit derivation may be done by selecting the mode which produces the smallest difference for the template.

Linear model filtering for intra-template matching (TMP) predicted block is now discussed. Intra-TMP is an intra-coding tool adopted in ECM7, which performs a template-based search in the already decodable (causal) area and determines the best template which minimizes the difference between reference template and the current template (template neighboring current block) to determine the displacement vector (or block vector). This block vector is then used to fetch corresponding reference block to be used for the prediction of the current block.

Video encoder 200 and video decoder 300 may be configured to apply a linear filtering model on top of the prediction block to further refine the prediction accuracy. The model may be derived using the reference template and current template, such that no further signaling of model parameters are needed. A 6-tap filter may include of 5-tap plus sign shape spatial component and a bias term.

Figure 6:
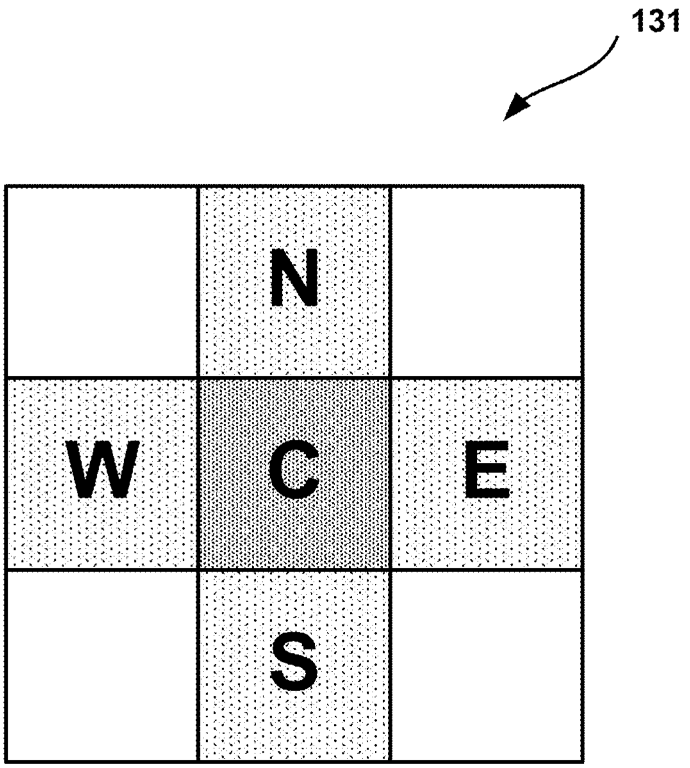
FIG. 6 is a conceptual diagram illustrating a spatial part of a filter.

FIG. 6 is a conceptual diagram illustrating a spatial part of a filter 131. The input to the spatial 5-tap component of filter 131 includes a center (C) sample in the reference block which is at corresponding locations with the sample in the current block to be predicted and the above/north (N), below/south (S), left/west (W) and right/east (E) neighbors as illustrated in FIG. 6. The bias term B represents a scalar offset between the input and output and is set to middle luma value (512 for 10-bit content). The output of the filter may be calculated as follows:

$$predLumaVal = c0C + c1N + c2S + c3E + c4W + c5B$$

Figure 7:
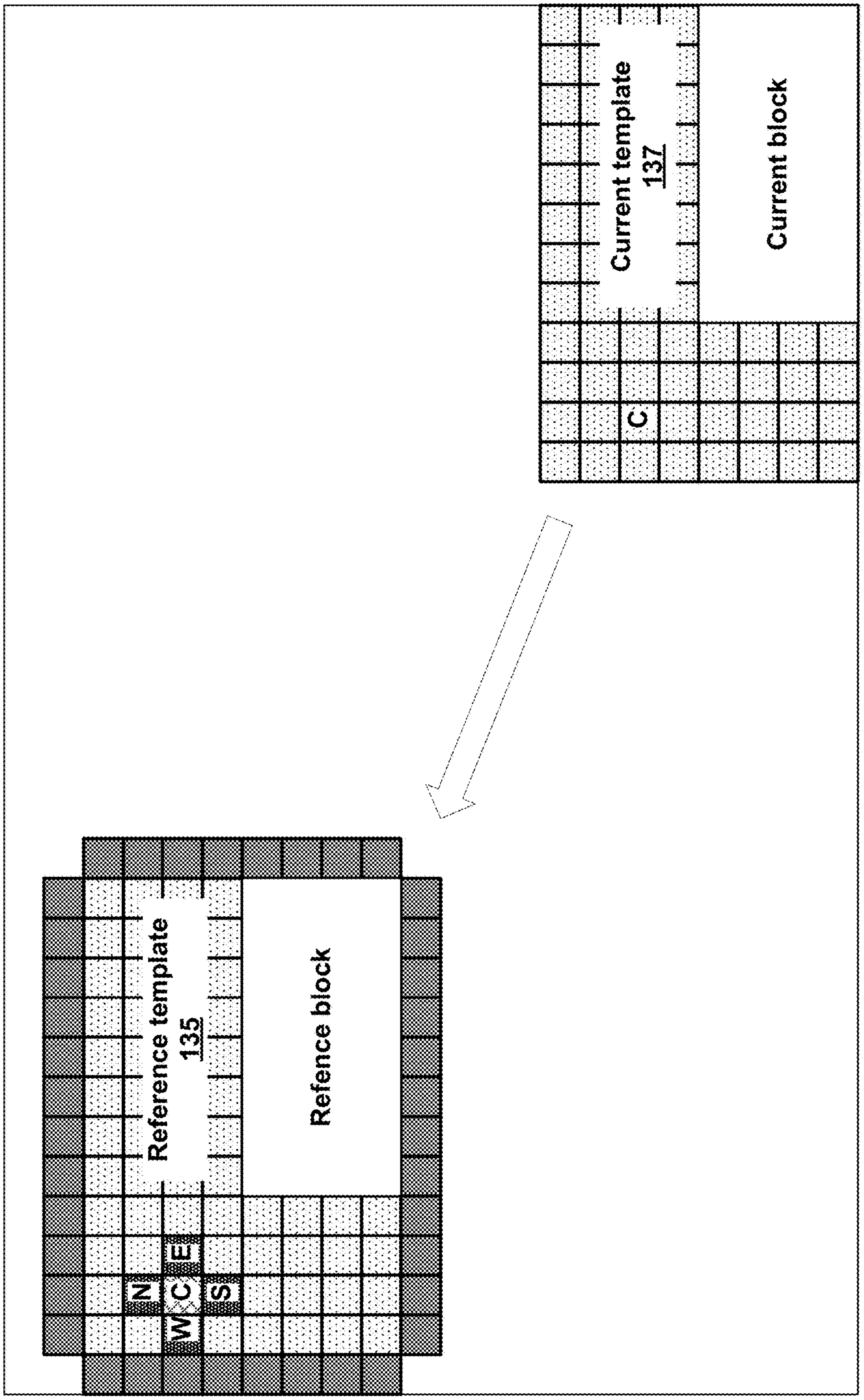
FIG. 7 is a conceptual diagram illustrating intra-template matching prediction (TMP) filtering.

FIG. 7 is a conceptual diagram illustrating intra-TMP filtering. Video encoder 200 and video decoder 300 may be configured to calculate the filter coefficients ci by minimizing the mean square error (MSE) between the reference template 135 and the current template 137, as shown in FIG. 7. The extensions to the area shown in the solid gray-shaded area needed to support the "side samples" of the plus shaped spatial filter and may be padded when located in unavailable areas.

Video encoder 200 and video decoder 300 may perform MSE minimization by calculating an autocorrelation matrix for the reference template input and current template output. The autocorrelation matrix may be LDL decomposed, and the final filter coefficients may be calculated using back-substitution.

Thus, video encoder 200B and video decoder 300 may determine filter coefficients (ci) such that when a filter based on the filter coefficients is applied to each sample of the reference template, a MSE of the filtered reference template and the current template is minimized. Video encoder 200B or video decoder 300 may then apply the filter to samples of the reference block.

Usage of the intra template matching prediction with filtered linear model (Intra TMP-FLM) mode may be signaled using a CU level flag. Intra TMP-FLM may be considered a sub-mode of intra TMP. That is, in some examples, the intra TMP-FLM flag may only be signaled if an intra TMP flag is true, meaning intra TMP is enabled.

A similar kind of filtering for IBC may also be beneficial, which is currently not present in ECM. The examples of this disclosure with respect to filtering for IBC may be applied independently or in a combined way.

In some examples, a filtering mode for IBC may be used as an additional mode. In some examples, filtering mode for IBC may not be applied together with IBC-LIC and (/or) IBC-CIIP (combined intra-inter prediction mode for IBC), i.e., if filtering mode for IBC is enabled, then LIC and(/or) CIIP is disabled. A signaling structure may be as follows:

```
If(isIBC)
{
        Parse isIBCFiltered
    If(!isIBCFiltered)
    {
            parse IBCLIC flag
    }
    If(!isIBCFiltered && !IBCLIC)
    {
        Parse IBCCIIP flag.
    }
}
```

In some examples, filtering mode for IBC may also replace IBC-LIC mode.

In some examples, filtering mode for IBC may only be applied to certain block sizes. For example, video encoder 200 and video decoder 300 may be configured to not apply filtering mode for IBC for a block size (area) smaller than a threshold. For example, filtering mode for IBC may not be applied for blocks with width*height<32.

In some examples, video encoder 200 and video decoder 300 may be configured to not apply filtering mode for IBC when neither left nor above template is fully available for the current block. For example, if the position of the CU is at (0,0), the signaling may be avoided. If the template size is T, then for a CU position (x, y), if x<T or y<T, the signaling of filtering mode for IBC may be avoided. Alternatively, some predetermined fixed filter model may be applied to those blocks.

Figure 8:
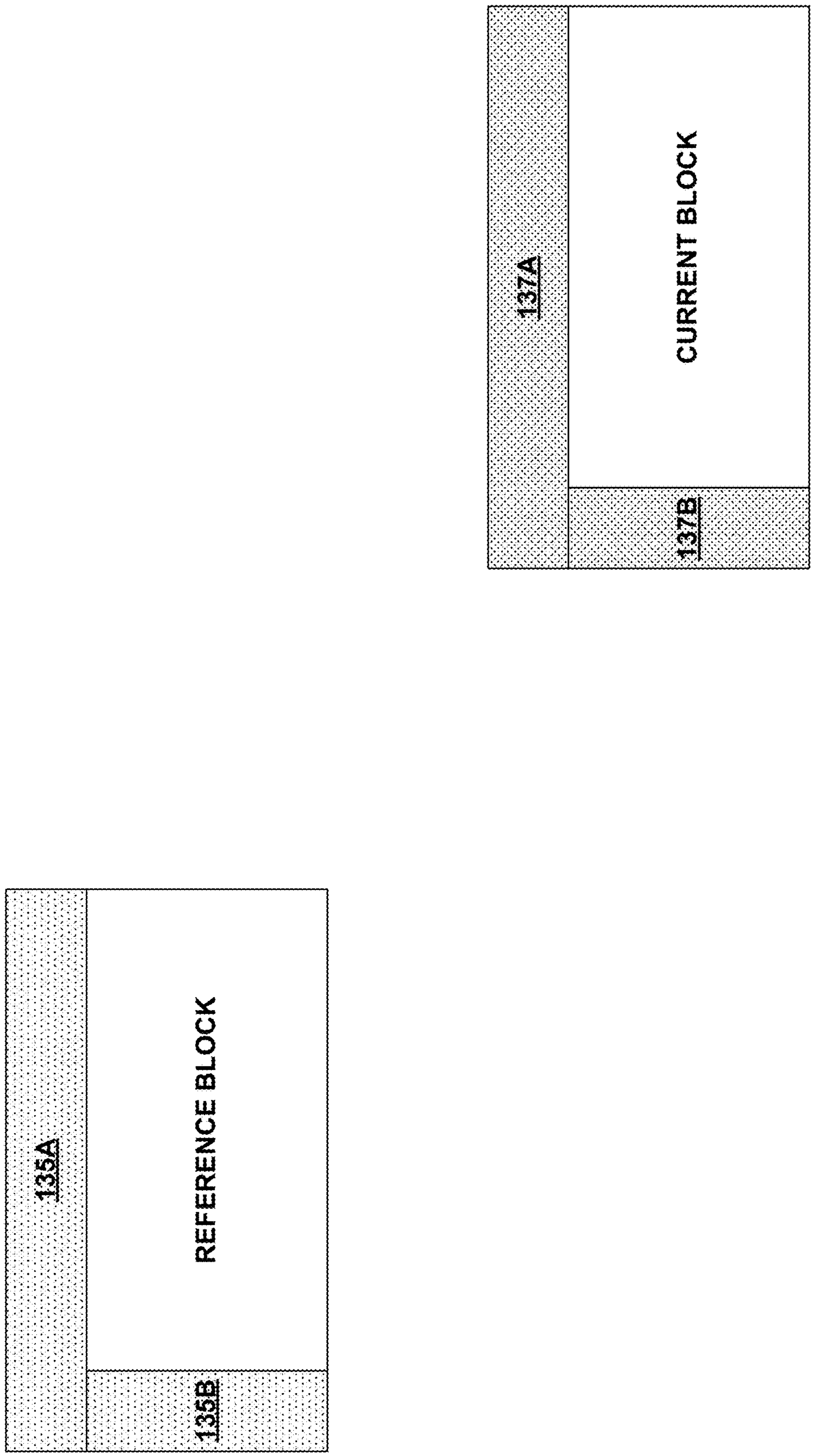
FIG. 8 is a conceptual diagram illustrating reference and current templates for IBC coded blocks according to techniques of this disclosure.

In some examples, the reference block and reference template may be contained in the IBC reference region. FIG. 8 is a conceptual diagram illustrating reference template 135, which is the combination of 135A and 135B, and current template 137, which is the combination of 137A and 137B, for IBC coded blocks according to techniques of this disclosure. If the reference template points outside the reference region, only a part of the template (which is inside the reference region) may be used to derive the model parameter. For example, in certain case, if the left template (e.g., template 135B) is outside the reference region but above template (e.g., template 135A) is inside the reference region, only above template 135A may be used for model generation. Alternatively, if the reference template points outside the reference region, the reference template outside of the reference region may be instead generated using padding from nearest samples inside the reference region.

In some examples, video encoder 200 and video decoder 300 may be configured, for a fractional block vector, to use only the integer part of the block vector to generate the reference template to generate the filter model without any associated interpolation (the reference block still is generated with fractional-pel motion compensation by interpolation).

In some examples, this process may only be applied when the block vector is at integer pixel (but not for fractional pixel block vector).

In some examples, video encoder 200 and video decoder 300 may be configured to apply different filter models (containing different filter shapes) for the filtering. This different model may be applied as multiple candidates with additional signaling. Alternatively, the appropriate filter (among those multiple filters) may be chosen implicitly depending on the block size or spatial characteristics.

Figure 9:
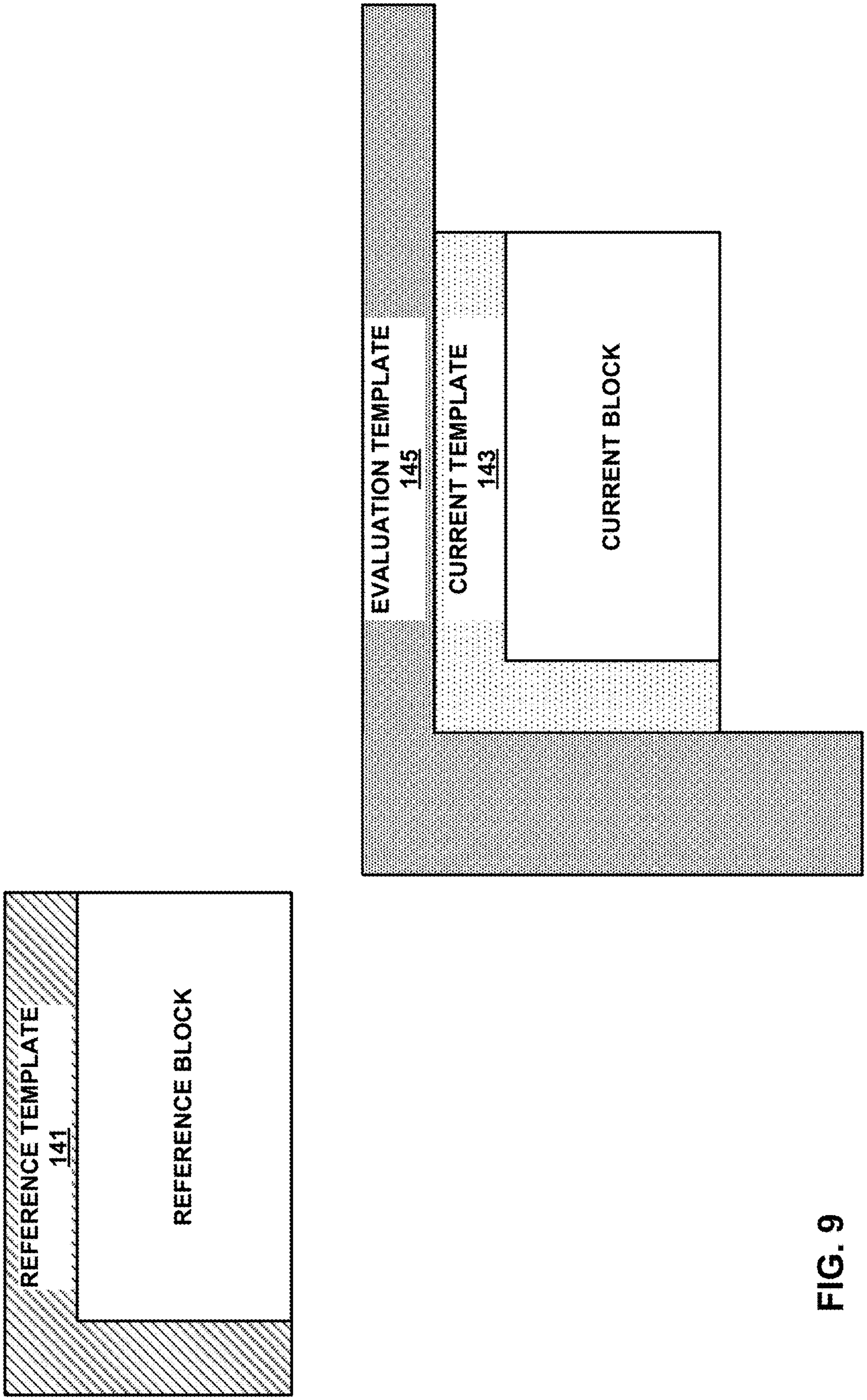
FIG. 9 is a conceptual diagram illustrating a reference template, a current template, and an evaluation template for IBC coded blocks according to techniques of this disclosure.

In some examples, video encoder 200 and video decoder 300 may be configured to reorder different filter models and/or multiple candidates based on calculating the difference between filtered prediction and the actual reconstruction on an evaluation template. The evaluation template may be chosen to include already decoded samples, so the reconstruction is available. The filtered prediction is generated by first performing IBC prediction using current block vector but for the evaluation template, and then applying the corresponding filter model. Alternatively, only the filter model having minimum difference may be used for the current block without extra signaling. FIG. 9 is a conceptual diagram illustrating a reference template 141, a current template 143, and an evaluation template 145 for IBC coded blocks according to techniques of this disclosure.

In some examples, video encoder 200 and video decoder 300 may be configured to may signal a filtering mode for IBC only for non-merge modes. For merge modes, filtering mode for IBC may be inherited, e.g., if the corresponding merge candidate has filtering mode for IBC enabled, then filtering mode for IBC may also be enabled for the current block because the enabling/disabling of the filtering mode for IBC is inherited). In another example, for certain IBC merge modes (IBC-CIIP, IBC-GPM), inheritance may be disabled.

In some examples, video encoder 200 and video decoder 300 may be configured to inherit the IBC filter mode for the current block only if the merge candidate is a composite candidate (composed of two or more single merge candidates) and if all the merge candidates have the filtering mode enabled (or in some examples at least one).

In some examples, video encoder 200 and video decoder 300 may be configured to only signal filtering mode for IBC for I slices.

In some examples, video encoder 200 and video decoder 300 may be configured to generate filter models using different templates (only left, only above or L shape) may be treated as multiple candidates, and then may be selected based on signaling (with/without reordering), or implicitly (based on size, spatial characteristics, or difference based on evaluation template.

In some examples, video encoder 200 and video decoder 300 may be configured to apply an additional filter to both the current and reference template (to remove high-frequency artefacts/noises) before deriving the model generation.

In some examples, an additional constraint of a filter being symmetric may also be used for filter model generation.

In some examples, video encoder 200 and video decoder 300 may be configured to apply a set of offline trained fixed model filters in addition to a template generated filter model.

In some examples, for a single-tree scenario (e.g., when luma and chroma blocks are coded together in a CU), this filtering part may only be constrained to a luma component, or in some examples, a chroma part may also have independent model generation and filtering.

In some examples, when the block vector is at fractional-pel and the extended reference area (i.e., reference block area, associated template with or without padding, and additionally extended area to account for the application of interpolation filter) is partially outside of available IBC reference region, the outside area may be padded from neighboring available area.

In some examples, video encoder 200 and video decoder 300 may be configured, for the fractional-pel block vector positions, to order different fractional-pel positions based on template distortion, i.e., the difference between current template and the reference template is calculated, and instead an index is signaled specifying the position of the fractional-pel candidate in that ordered list. Additionally, not all fractional-pel position may be signaled. Instead, first few fractional-pel candidate (a subset) is signaled with an index.

In some examples, video encoder 200 and video decoder 300 may be configured to select the context of a filtering mode based on a coding mode of a neighboring block. A few additional examples may include whether a neighboring block uses IBC-filtering, whether a neighboring block uses IBC-LIC or IBC-filtering, or whether a neighboring block uses IBC-LIC or IBC-filtering or Intra-TMP filtering.

In some examples, when the reference template (and/or current template) is either fully or partially unavailable, video encoder 200 and video decoder 300 may be configured to use a fixed filtering (e.g., fixed parameter model filtering) instead of deriving a model based on template. Additionally, this fixed parameter model filtering may be based on the dominant direction of the IBC block vector predicted block or based on the current template gradient direction. Also, the filtering may also be dependent on the gradient magnitude (degree of smoothness) of either the current template or block vector predicted block. Alternatively or additionally, if the reference template and the current template is very different from each other, fixed parameter filtering may be applied.

In some examples, a high-level flag may enable/disable this coding tool. For instance, video encoder 200B or video decoder 300 may encode or decode a syntax element that indicates whether a coding tool that determines the IBC reference block, calculates the coefficients, and applies the filter is enabled or disabled.

In some examples, video encoder 200 and video decoder 300 may be configured to signal an SPS level flag to indicate whether this tool is enabled/disabled in sequence level. This flag may be conditionally signaled based on the IBC flag, i.e., when IBC is enabled only then this flag is signaled. Additionally, this flag may also be conditionally signaled based on Intra-TMP flag. An example may be when Intra-TMP flag is disabled, this flag may be signaled. If this flag is not signaled, then the value of the flag may be inferred to be zero.

In some examples, video encoder 200 and video decoder 300 may be configured to enable/disable this tool at a slice level. The signaling may also be dependent on whether IBC is enabled for that particular slice, i.e., the signaling may be dependent on slice level IBC enabled flag.

Figure 10:
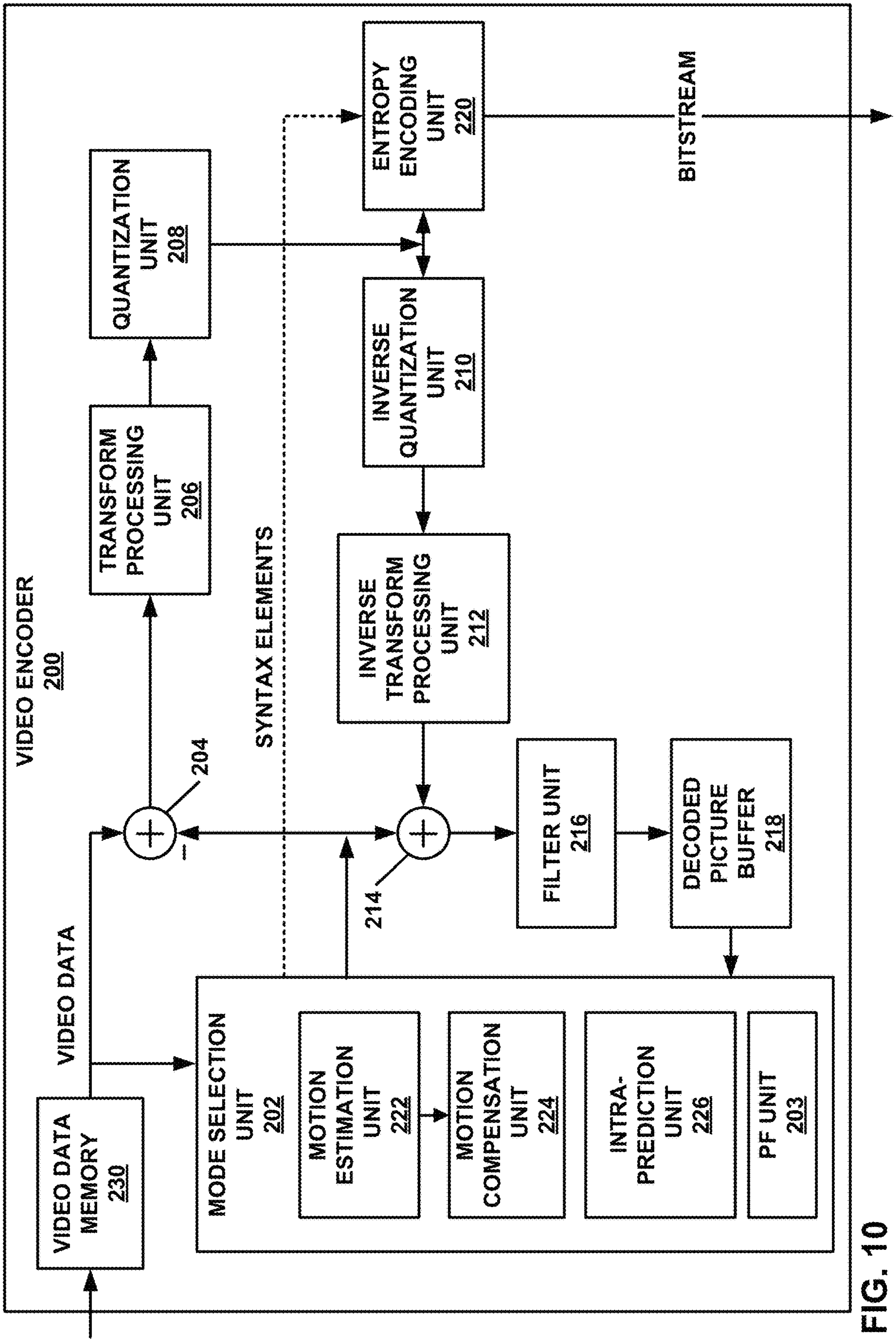
FIG. 10 is a block diagram illustrating an example video encoder that may perform the techniques of this disclosure.

FIG. 10 is a block diagram illustrating an example video encoder 200 that may perform the techniques of this disclosure. FIG. 10 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 10, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 10 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUS, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and LM mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

Mode selection unit 202 also include prediction filter (PF) unit 203, which may perform the prediction filtering techniques of this disclosure. As part of generating a prediction block, PF unit 203 may determine whether to apply filtering to the prediction block, and based on determining that the filtering is to be applied to the prediction block, compare a template of a reference block to a template of the current block and filter the prediction block based on the comparing of the template of the reference block to the template of the current block to determine a filtered prediction block. PF unit 203 may, for example, determine a filter that minimizes a difference between sample values of the template of the reference block and sample values of the template of the current block and filter the prediction block with the determined filter. Application of the filter may modify the sample values of the template of the current block to reduce a mean square error between the sample values of the template of the current block and the sample values of the template of the reference block. Accordingly, when PF unit 203 applies the filter to the prediction block, the filter may also reduce a mean square error between the prediction block and the corresponding original block of video data.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a prediction block for a current block of a current picture of video data; compare a template of the prediction block to a template of the current block; filter the prediction block based on the comparison of the template of the prediction block to the template of the current block to determine a filtered prediction block; and encode the current block based on the filtered prediction block.

Figure 11:
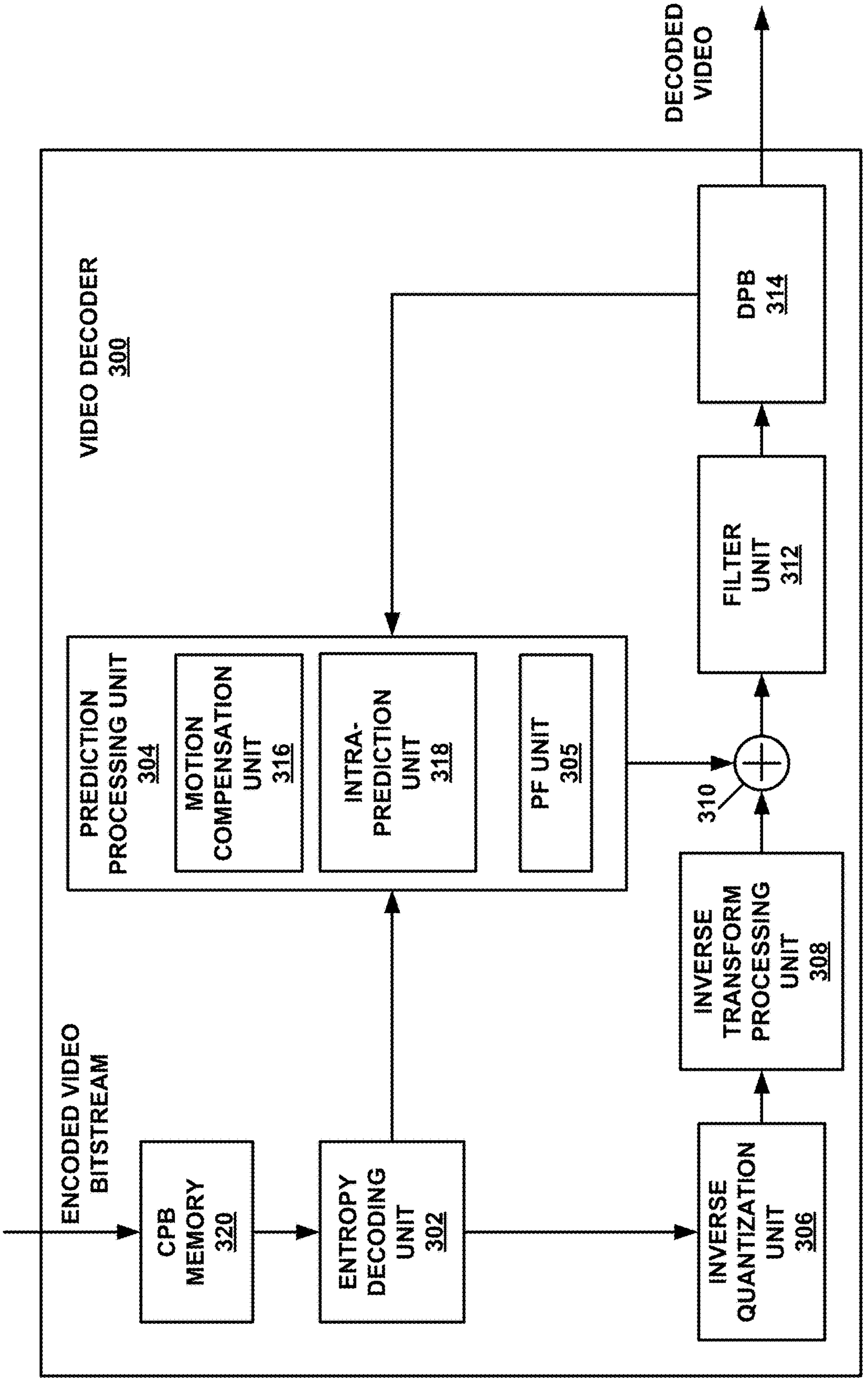
FIG. 11 is a block diagram illustrating an example video decoder that may perform the techniques of this disclosure.

FIG. 11 is a block diagram illustrating an example video decoder 300 that may perform the techniques of this disclosure. FIG. 11 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 11, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, an LM unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 11 are illustrated to assist with understanding the operations performed by video decoder 300. The units may be implemented as fixed-function circuits, programmable circuits, or a combination thereof. Similar to FIG. 10, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 10).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 10). Intra-prediction unit 318 may retrieve data of neighboring samples to the current block from DPB 314.

Prediction processing unit 304 also includes PF unit 305, which may perform the prediction filtering techniques of this disclosure. As part of generating a prediction block, PF unit 305 may determine whether to apply filtering to the prediction block, and based on determining that the filtering is to be applied to the prediction block, compare a template of a reference block to a template of the current block and filter the prediction block based on the comparing of the template of the reference block to the template of the current block to determine a filtered prediction block. PF unit 305 may, for example, determine a filter that minimizes a difference between sample values of the template of the reference block and sample values of the template of the current block and filter the prediction block with the determined filter. Application of the filter may modify the sample values of the template of the current block to reduce a mean square error between the sample values of the template of the current block and the sample values of the template of the reference block. Accordingly, when PF unit 305 applies the filter to the prediction block, the filter may also reduce a mean square error between the prediction block and the corresponding original block of video data.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a prediction block for a current block of a current picture of video data; compare a template of the prediction block to a template of the current block; filter the prediction block based on the comparison of the template of the prediction block to the template of the current block to determine a filtered prediction block; and decode the current block based on the filtered prediction block.

Figure 12:
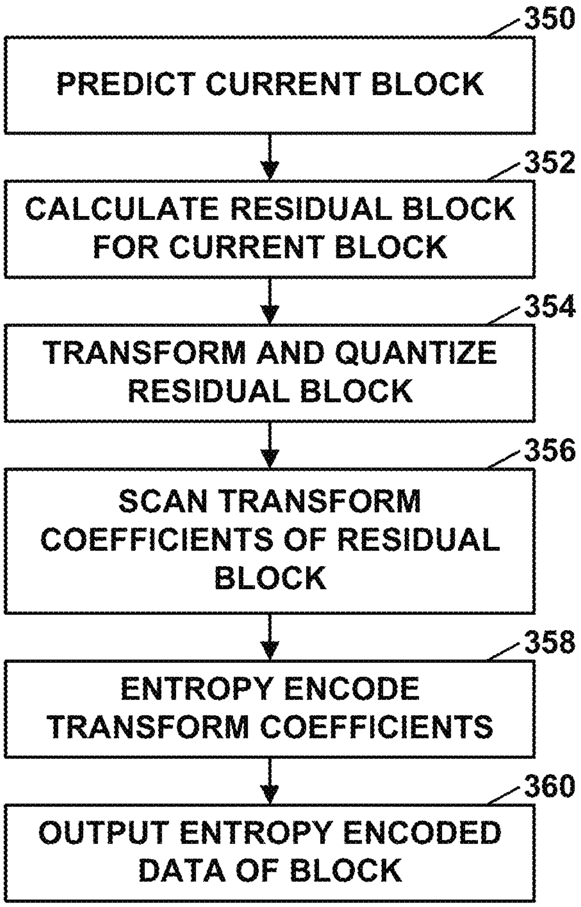
FIG. 12 is a flowchart illustrating an example process for encoding a current block in accordance with the techniques of this disclosure.

FIG. 12 is a flowchart illustrating an example process for encoding a current block in accordance with the techniques of this disclosure. The current block may be or include a current CU. Although described with respect to video encoder 200 (FIGS. 1 and 10), it should be understood that other devices may be configured to perform a process similar to that of FIG. 12.

In this example, video encoder 200 initially predicts the current block (350). This prediction may include the filtering techniques described herein. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 13:
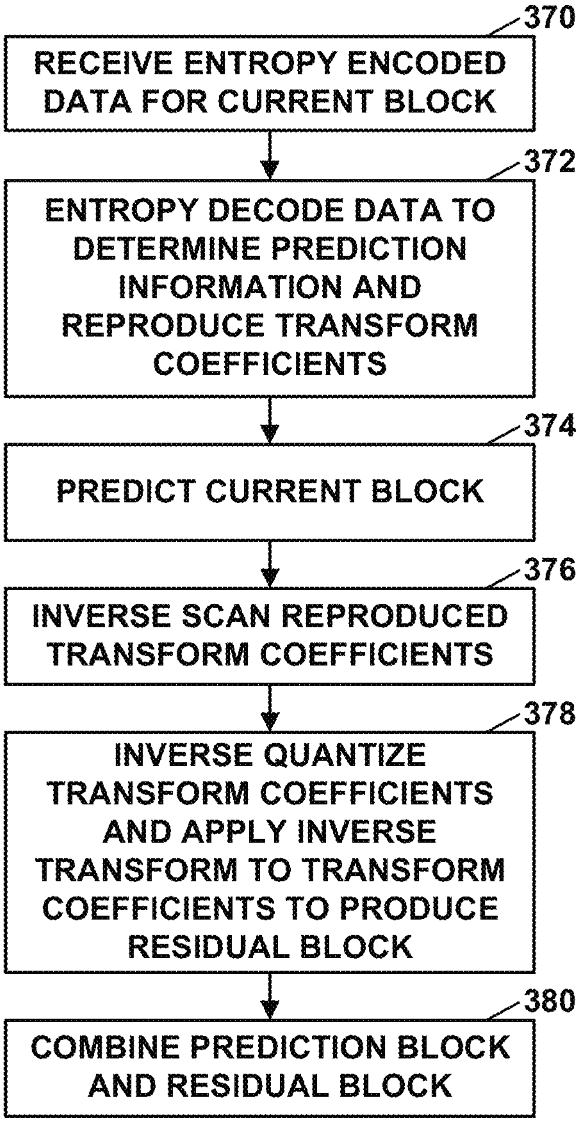
FIG. 13 is a flowchart illustrating an example process for decoding a current block in accordance with the techniques of this disclosure.

FIG. 13 is a flowchart illustrating an example process for decoding a current block of video data in accordance with the techniques of this disclosure. The current block may be or include a current CU. Although described with respect to video decoder 300 (FIGS. 1 and 11), it should be understood that other devices may be configured to perform a process similar to that of FIG. 13.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an IBC, intra-, or inter-prediction mode as indicated by the prediction information for the current block, to calculate a prediction block for the current block. This prediction may include the filtering techniques described herein. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 14:
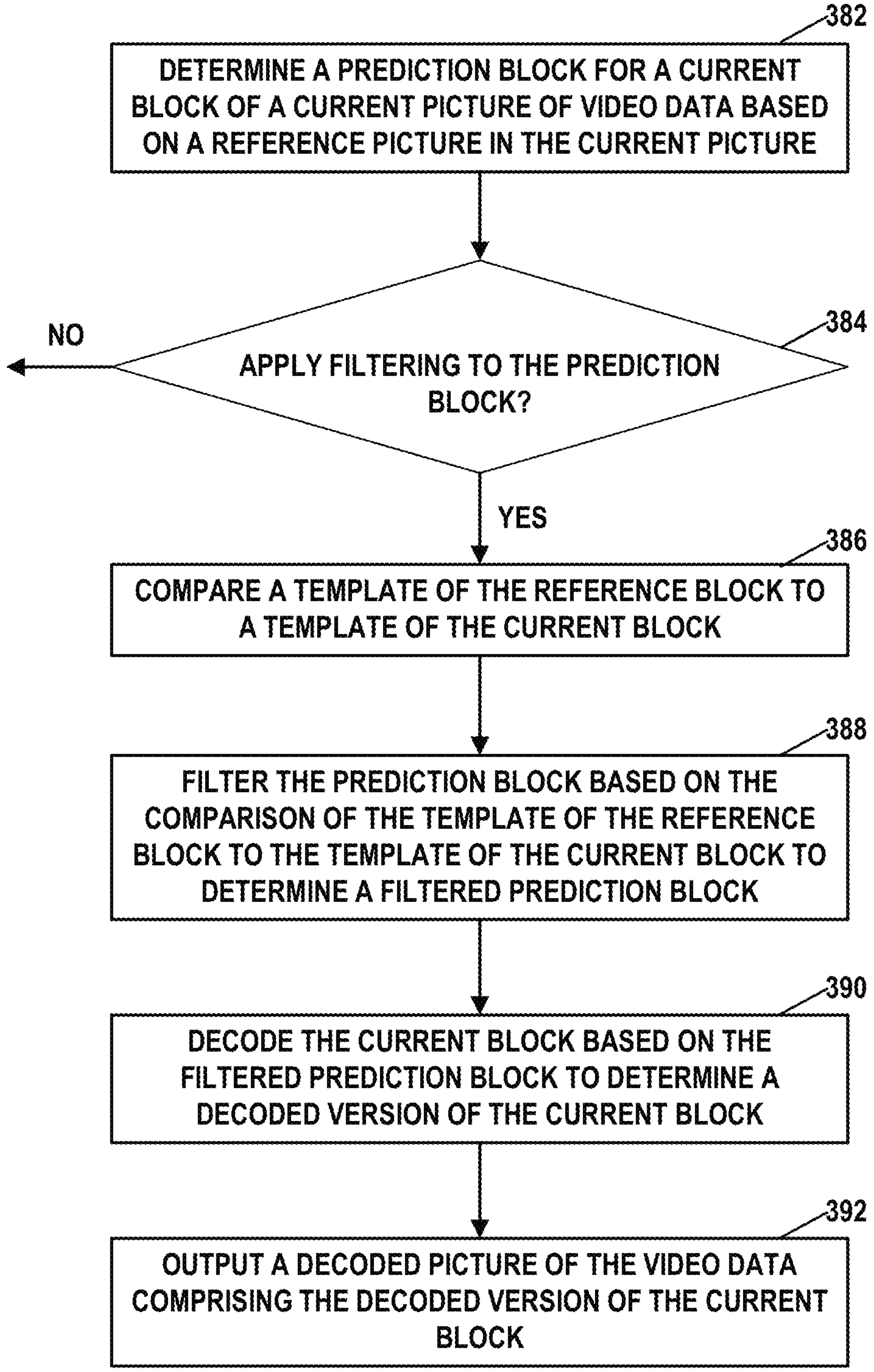
FIG. 14 is a flowchart illustrating an example process for decoding a current block in accordance with the techniques of this disclosure.

FIG. 14 is a flowchart illustrating an example process for decoding a current block of video data in accordance with the techniques of this disclosure. The current block may be or include a current CU. Although described with respect to video decoder 300 (FIGS. 1 and 11), it should be understood that other devices may be configured to perform a process similar to that of FIG. 14. For example, In the example of FIG. 14, video decoder 300 determines a prediction block for a current block of a current picture of video data based on a reference block in the current picture (382). The prediction block may, for example, be a copy of a reference block in the current picture. Video decoder 300 may, for example, determine the prediction block for the current block of the current picture by locating a reference block in a same picture as the current block using a block vector.

Video decoder 300 determines whether to apply filtering to the prediction block (384). Based on determining that the filtering is to be applied to the prediction block (384, yes), video decoder 300 compares a template of the reference block to a template of the current block (386) and filters the prediction block based on the comparison of the template of the reference block to the template of the current block to determine a filtered prediction block (388). Based on determining that the filtering is not to be applied to the prediction block (384, no), then video decoder 300 decodes the current block without filtering the prediction block.

The template of the reference block may be an L-shaped group of samples that includes samples left of a reference block used to determine the prediction block and samples above the reference block, and the template of the current block may be an L-shaped group of samples that includes the samples left of the current block and samples above the current block. In some instance, the template of the reference block may include padded samples.

To filter the prediction block based on the comparing of the template of the reference block to the template of the current block to determine a filtered prediction block, video decoder 300 may be configured to determine a filter that minimizes a difference between sample values of the template of the reference block and sample values of the template of the current block and filter the prediction block with the determined filter. To determine the filter that minimizes the difference between sample values of the template of the reference block and the sample values of the template of the current block, video decoder 300 may determine a filter that modifies the sample values of the template of the current block to reduce a mean square error between the sample values of the template of the current block and the sample values of the template of the reference block. In some examples, video decoder 300 may determine not to filter the prediction block based on the comparing of the template of the reference block to the template of the current block such that the filtered prediction block is equal to the prediction block.

To determine whether to apply the filtering to the prediction block, video decoder 300 may, for example, receive a flag where a first value for the flag indicates that an intra block copy with filtering mode is enabled and a second value for the flag indicates that the intra block copy with filtering mode is disabled. To determine whether to apply the filtering to the prediction block, video decoder 300 may additionally or alternatively determine a size for the current block and determine that the filtering is to be applied to the prediction block by determining that the size is greater than a threshold size. To determine whether to apply the filtering to the prediction block, video decoder 300 may determine whether to apply the filtering to the prediction block based on a slice type for the current block being an intra slice. For example, receiving the flag may be conditional on the size being greater than the threshold size and/or the slice of the current block being an I slice. To determine the prediction block for the current block of the current picture of video data, video decoder 300 may determine a block vector for the current block based on a candidate selected from a merge list, and to determine whether to apply the filtering to the prediction block, video decoder 300 may determine whether a prediction block corresponding to the candidate was determined with the filtering.

Video decoder 300 decodes the current block based on the filtered prediction block to determine a decoded version of the current block (390). To decode the current block, video decoder 300 may, for example, add residual data to the filtered prediction block to determine a reconstructed block and apply one or more filtering operations to the reconstructed block.

Video decoder 300 outputs a decoded picture of the video data comprising the decoded version of the current block (392). To output the decoded picture, video decoder 300 may, for example, display the decoded picture, store or transmit a copy of the decoded picture for later display, or store a copy of the decoded picture for use in encoding or decoding other pictures of the video data.

The following numbered clauses illustrate one or more aspects of the devices and techniques described in this disclosure.

Clause 1A: A method of decoding video data, the method comprising: determining a prediction block for a current block of a current picture of video data; comparing a template of the prediction block to a template of the current block; filtering the prediction block based on the comparison of the template of the prediction block to the template of the current block to determine a filtered prediction block; and decoding the current block based on the filtered prediction block.

Clause 2A: The method of clause 1A, wherein filtering the prediction block based on the comparison of the template of the prediction block to the template of the current block to determine a filtered prediction block comprises: determining a filter that minimizes a difference between the template of the prediction block and the template of the current block; and filtering the prediction block with the determined filter.

Clause 3A: The method of clause 1A, wherein filtering the prediction block based on the comparison of the template of the prediction block to the template of the current block to determine a filtered prediction block comprises: determining not to filter the prediction block based on the comparison of the template of the prediction block to the template of the current block such that the filtered prediction block is equal to the prediction block.

Clause 4A: The method of clause 1A, further comprising: receiving a flag; and filtering the prediction block based on a value of the flag.

Clause 5A: A device for decoding video data, the device comprising one or more means for performing the method of any of clauses 1A-4A.

Clause 6A: The device of clause 5A, wherein the one or more means comprise one or more processors implemented in circuitry.

Clause 7A: The device of any of clauses 5A and 6A, further comprising a memory to store the video data. Clause 8A: The device of any of clauses 5A-7A, further comprising a display configured to display decoded video data.

Clause 9A: The device of any of clauses 5A-8A, wherein the device comprises one or more of a camera, a computer, a mobile device, a broadcast receiver device, or a set-top box.

Clause 10A: The device of any of clauses 5A-9A, wherein the device comprises a video decoder.

Clause 11A: The device of any of clauses 5A-10A, wherein the device comprises a video encoder.

Clause 12A: A computer-readable storage medium having stored thereon instructions that, when executed, cause one or more processors to perform the method of any of clauses 1A-4A.

Clause 1B: A method of decoding video data, the method comprising: determining a prediction block for a current block of a current picture of video data; comparing a template of the prediction block to a template of the current block; filtering the prediction block based on the comparison of the template of the prediction block to the template of the current block to determine a filtered prediction block; decoding the current block based on the filtered prediction block to determine a decoded version of the current block; and outputting a decoded picture of the video data comprising the decoded version of the current block.

Clause 2B: The method of clause 1B, wherein filtering the prediction block based on the comparison of the template of the prediction block to the template of the current block to determine a filtered prediction block comprises: determining a filter that minimizes a difference between sample values of the template of the prediction block and sample values of the template of the current block; and filtering the prediction block with the determined filter.

Clause 3B: The method of clause 2B, wherein determining the filter that minimizes the difference between sample values of the template of the prediction block and the sample values of the template of the current block comprises determining a filter that modifies the sample values of the template of the current block to reduce a mean square error between the sample values of the template of the current block and the sample values of the template of the prediction block.

Clause 4B: The method of clause 1B, wherein filtering the prediction block based on the comparison of the template of the prediction block to the template of the current block to determine a filtered prediction block comprises: determining not to filter the prediction block based on the comparison of the template of the prediction block to the template of the current block such that the filtered prediction block is equal to the prediction block.

Clause 5B: The method of clause 1B, wherein the template of the prediction block comprises an L-shaped group of samples that includes samples to the left of a reference block used to determine the prediction block and samples above the reference block, and the template of the current block comprises an L-shaped group of samples that includes samples to the left of the current block and samples above the current block.

Clause 6B: The method of clause 1B, wherein determining the prediction block for the current block of the current picture of video data comprises locating a reference block in a same picture as the current block using a block vector.

Clause 7B: The method of clause 1B, wherein determining the prediction block for the current block of the current picture of video data comprises locating a reference block in a reference picture using a motion vector.

Clause 8B: The method of clause 1B, wherein decoding the current block based on the filtered prediction block comprises: adding residual data to the filtered prediction block to determine a reconstructed block; and applying one or more filter operations to the reconstructed block.

Clause 9B: The method of clause 1B, wherein the method of decoding is performed as part of a process of encoding the current block of video data.

Clause 10B: A device for decoding video data, the device comprising: a memory configured to store video data; one or more processors implemented in circuitry and configured to: determine a prediction block for a current block of a current picture of video data; compare a template of the prediction block to a template of the current block; filter the prediction block based on the comparison of the template of the prediction block to the template of the current block to determine a filtered prediction block; decode the current block based on the filtered prediction block to determine a decoded version of the current block; and output a decoded picture of the video data comprising the decoded version of the current block.

Clause 11B: The device of clause 10B, wherein to filter the prediction block based on the comparison of the template of the prediction block to the template of the current block to determine a filtered prediction block, the one or more processors are further configured to: determine a filter that minimizes a difference between sample values of the template of the prediction block and sample values of the template of the current block; and filter the prediction block with the determined filter.

Clause 12B: The device of clause 11B, wherein to determine the filter that minimizes the difference between sample values of the template of the prediction block and the sample values of the template of the current block, the one or more processors are further configured to determine a filter that modifies the sample values of the template of the current block to reduce a mean square error between the sample values of the template of the current block and the sample values of the template of the prediction block.

Clause 13B: The device of clause 11B, wherein to filter the prediction block based on the comparison of the template of the prediction block to the template of the current block to determine a filtered prediction block, the one or more processors are further configured to: determine not to filter the prediction block based on the comparison of the template of the prediction block to the template of the current block such that the filtered prediction block is equal to the prediction block.

Clause 14B: The device of clause 11B, wherein the template of the prediction block comprises an L-shaped group of samples that includes samples to the left of a reference block used to determine the prediction block and samples above the reference block, and the template of the current block comprises an L-shaped group of samples that includes samples to the left of the current block and samples above the current block.

Clause 15B: The device of clause 11B, wherein to determine the prediction block for the current block of the current picture of video data, the one or more processors are further configured to locate a reference block in a same picture as the current block using a block vector.

Clause 16B: The device of clause 11B, wherein to determine the prediction block for the current block of the current picture of video data, the one or more processors are further configured to locate a reference block in a reference picture using a motion vector.

Clause 17B: The device of clause 11B, wherein to decode the current block based on the filtered prediction block, the one or more processors are further configured to: add residual data to the filtered prediction block to determine a reconstructed block; and apply one or more filter operations to the reconstructed block.

Clause 18B: The device of clause 10B, further comprising: a display configured to output the decoded picture of the video data.

Clause 19B: The device of clause 10B, further comprising: a camera configured to capture unencoded video data; and wherein the one or more processors are further configured to encode the unencoded video data.

Clause 20B: A computer-readable storage medium storing instructions that when executed by one or more processors cause the one or more processors to: determine a prediction block for a current block of a current picture of video data; compare a template of the prediction block to a template of the current block; filter the prediction block based on the comparison of the template of the prediction block to the template of the current block to determine a filtered prediction block; decode the current block based on the filtered prediction block to determine a decoded version of the current block; and output a decoded picture of the video data comprising the decoded version of the current block.

Clause 1C: A method of encoding or decoding video data, the method comprising: determining an Intra Block Copy (IBC) reference block within a current picture for a current block within the current picture, wherein a block vector for the current block indicates a displacement from the current block to the IBC reference block; based on a filtering mode being enabled for the current block: calculating coefficients for a filter based on a reference template for the IBC reference block and a current template for the current block; and applying the filter to the IBC reference block; and after applying the filter to the IBC reference block, encoding or decoding the current block using the IBC reference block.

Clause 2C: The method of clause 1C, wherein applying the filter to the IBC reference block comprises, based on the filtering mode being enabled for the current block, disabling an IBC-local illumination compensation (LIC) mode for the current block and an IBC-combined intra-inter prediction mode for the current block.

Clause 3C: The method of any of clauses 1C-2C, further comprising determining, based on a size of the current block, whether to apply the filter to the IBC reference block.

Clause 4C: The method of any of clauses 1C-3C, further comprising determining, based on whether a left template or an above template is fully available, whether to apply the filter to the IBC reference block.

Clause 5C: The method of any of clauses 1C-4C, wherein calculating the coefficients comprises: based on only a part of the reference template being within an IBC reference region for the current block or a part of the current template being within the IBC reference region for the current block, using only the part of the reference template within the IBC reference region for the current block or the part of the current template being within the IBC reference region for the current block to calculate the coefficients for the filter.

Clause 6C: The method of any of clause 1C-4C, wherein calculating the coefficients comprises: based on a part of the reference template not being within an IBC reference region for the current block or a part of the current template not being within the IBC reference region, using padded samples and samples of the reference template or current template within the IBC reference region to calculate the coefficients.

Clause 7C: The method of any of clauses 1C-6C, wherein, based on the block vector being fractional, using only an integer part of the block vector to generate the reference template.

Clause 8C: The method of any of clauses 1C-6C, further comprising determining that the filtering mode is enabled for the current block only when block vector is at an integer pixel level.

Clause 9C: The method of any of clauses 1C-8C, further comprising determining a filter model from among a plurality of available filter models having different filter shapes, wherein the filter applied to the IBC reference block is the determined filter model.

Clause 10C: The method of clause 9C, further comprising reordering a list of the available filter models based on a difference between a filtered prediction and a reconstruction of an evaluation template.

Clause 11C: The method of any of clauses 1C-10C, wherein one or more syntax elements indicating that the filter to the IBC reference block is applied to the IBC reference block are signaled only when non-merge modes are used for signaling the block vector.

Clause 12C: The method of any of clauses 1C-11C, wherein: the method further comprises generating a merge candidate list that includes intra block copy (IBC) candidates, wherein each of the IBC candidates indicates a respective block vector; determining the IBC reference block comprises determining the block vector for the current block from among block vectors indicated by the IBC candidates in the merge candidate list, and a merge candidate index indicating a position of the block vector for the current block within the merge candidate list is signaled in a bitstream.

Clause 13C: The method of clause 12C, wherein: a selected IBC candidate indicates the block vector for the current block, and the method further comprises, based on the selected IBC candidate being a composite candidate, determining that the filtering mode is enabled for the current block based on whether the filtering mode is enabled for the composite candidate.

Clause 14C: The method of any of clauses 1C-13C, wherein the filtering mode is enabled only for blocks in I slices.

Clause 15C: The method of any of clauses 1C-14C, wherein: generating a plurality of filter models using a plurality of different sets of current templates and reference templates; and determining a filter model defining the filter from among the filter models.

Clause 16C: The method of any of clauses 1C-15C, further comprising applying an additional filter to the current template and the reference template before calculating the coefficients.

Clause 17C: The method of any of clauses 1C-16C, wherein a constraint requires the filter to be symmetric.

Clause 18C: The method of any of clauses 1C-17C, further comprising applying a set of offline-trained fixed model filters to the IBC reference block.

Clause 19C: The method of any of clauses 1C-18C, wherein luma and chroma samples of the current block are coded together and the filter is applied only to luma samples of the IBC reference block.

Clause 20C: The method of clause 19C, further comprising: calculating coefficients of a second filter based on chroma samples of the reference template and chroma samples of the current template; and applying the second filter to chroma samples of the IBC reference block.

Clause 21C: The method of any of clauses 1C-11B or 14C-20C, wherein: the method further comprises generating an advanced motion vector prediction (AMVP) candidate list that includes AMVP candidates, wherein each of the AMVP candidates indicates a respective block vector; the block vector for the current block is defined by a block vector of a selected AMVP candidate in the AMVP candidate list and a motion vector difference (MVD); and an AMVP candidate index and the MVD are signaled in a bitstream.

Clause 22C: The method of any of clauses 1C-21C, further comprising: based on the block vector for the current block having a fractional-pixel accuracy and an extended reference area being partially outside of an available IBC reference region, padding an area of the extended reference area from a neighboring area of the available IBC reference region.

Clause 23C: The method of any of clauses 1C-22C, wherein: the reference template is a selected reference template, and the method further comprises: based on the block vector having fractional-pixel accuracy, generating an ordered list of fractional-pixel candidates, wherein each fractional-pixel candidates corresponds to a respective reference template, and the fractional-pixel candidates within the ordered list are ordered based on differences between the current template and the corresponding reference templates, wherein an index signaled in a bitstream indicates a position of the selected fractional-pixel candidate in the ordered list.

Clause 24C: The method of any of clauses 1C-23C, further comprising selecting a context of the filtering mode based on a coding mode of a neighboring block.

Clause 25C: The method of any of clauses 1C-24C, wherein the current block is a first block, the IBC reference block is a first IBC reference block, and the method further comprises: determining a second IBC reference block for a second block within the current picture, wherein a block vector for the second block indicates a displacement between the second block to the second IBC reference block; based on at least one of: an availability of a reference template for the second IBC reference block or a similarity of a reference template for the second IBC reference block and a current template for the second block, applying the fixed filter to the second IBC reference block, wherein the fixed filter is based on fixed parameters; and after applying the fixed filter to the second IBC reference block, encoding or decoding the second block using the second IBC reference block.

Clause 26C: The method of clause 25C, further comprising determining the fixed parameters based on a dominant direction of the block vector for the second block.

Clause 27C: The method of clause 25C or 26C, further comprising determining the fixed parameters based on a gradient magnitude of the second IBC reference block or the reference template for the second IBC reference block.

Clause 28C: The method of any of clauses 1C-27C, further comprising encoding or decoding a syntax element that indicates whether a coding tool that determines the IBC reference block, calculates the coefficients, and applies the filter is enabled or disabled.

Clause 29C: The method of clause 28C, wherein the syntax element is conditionally signaled based on an intra block copy (IBC) flag.

Clause 30C: The method of any of clauses 28C-29C, wherein the syntax element is a sequence parameter set (SPS) level syntax element.

Clause 31C: The method of any of clauses 28C-29C, wherein the syntax element is a slice level syntax element.

Clause 32C: A device for coding video data, the device comprising one or more means for performing the method of any of clauses 1C-31C.

Clause 33C: The device of clause 32C, wherein the one or more means comprise one or more processors implemented in circuitry.

Clause 34C: The device of any of clauses 32C and 33C, further comprising a memory to store the video data.

Clause 35C: The device of any of clauses 32C-34C, further comprising a display configured to display decoded video data.

Clause 36C: The device of any of clauses 32C-35C, wherein the device comprises one or more of a camera, a computer, a mobile device, a broadcast receiver device, or a set-top box.

Clause 37C: The device of any of clauses 32C-36C, wherein the device comprises a video decoder.

Clause 38C: The device of any of clauses 32C-37C, wherein the device comprises a video encoder.

Clause 39C: A computer-readable storage medium having stored thereon instructions that, when executed, cause one or more processors to perform the method of any of clauses 1C-31C.

Clause 1D: A method of decoding video data, the method comprising: determining a reference block for a current block of a current picture of video data, wherein the reference block is in the current picture; determining a prediction block based on the reference block; determining whether to apply filtering to the prediction block; based on determining that the filtering is to be applied to the prediction block: comparing a template of the reference block to a template of the current block; filtering the prediction block based on the comparing of the template of the reference block to the template of the current block to determine a filtered prediction block; decoding the current block based on the filtered prediction block to determine a decoded version of the current block; and outputting a decoded picture of the video data comprising the decoded version of the current block.

Clause 2D: The method of clause 1D, wherein determining whether to apply the filtering to the prediction block comprises receiving a flag, wherein a first value for the flag indicates that an intra block copy with filtering mode is enabled and a second value for the flag indicates that the intra block copy with filtering mode is disabled.

Clause 3D: The method of clause 1C or 2D, wherein determining whether to apply the filtering to the prediction block comprises determining a size for the current block and determining that the filtering is to be applied to the prediction block comprises determining that the size is greater than a threshold size.

Clause 4D: The method of any of clauses 1D-3D, wherein the template of the reference block comprises padded samples.

Clause 5D: The method of any of clauses 1D-4D, wherein: determining prediction block for the current block of the current picture of video data comprises determining a block vector for the current block based on a candidate selected from a merge list; and determining whether to apply the filtering to the prediction block comprises determining whether a prediction block corresponding to the candidate was determined with the filtering.

Clause 6D: The method of any of clauses 1D-6D, wherein determining whether to apply the filtering to the prediction block comprises determining whether to apply the filtering to the prediction block based on a slice type for the current block being an intra slice.

Clause 7D: The method of any of clauses 1D-6D, wherein filtering the prediction block based on the comparing of the template of the reference block to the template of the current block to determine a filtered prediction block comprises: determining a filter that minimizes a difference between sample values of the template of the reference block and sample values of the template of the current block; and filtering the prediction block with the determined filter.

Clause 8D: The method of clause 7D, wherein determining the filter that minimizes the difference between sample values of the template of the reference block and the sample values of the template of the current block comprises determining a filter that modifies the sample values of the template of the current block to reduce a mean square error between the sample values of the template of the current block and the sample values of the template of the reference block.

Clause 9D: The method of any of clauses 1D-8D, wherein filtering the prediction block based on the comparing of the template of the reference block to the template of the current block to determine a filtered prediction block comprises: determining not to filter the prediction block based on the comparing of the template of the reference block to the template of the current block such that the filtered prediction block is equal to the prediction block.

Clause 10D: The method of any of clauses 1D-9D, wherein the template of the reference block comprises an L-shaped group of samples that includes samples left of a reference block used to determine the prediction block and samples above the reference block, and the template of the current block comprises an L-shaped group of samples that includes the samples left of the current block and samples above the current block.

Clause 11D: The method of any of clauses 1D-10D, wherein determining the prediction block for the current block of the current picture of video data comprises locating a reference block in a same picture as the current block using a block vector.

Clause 12D: The method of any of clauses 1D-11D, wherein decoding the current block based on the filtered prediction block comprises: adding residual data to the filtered prediction block to determine a reconstructed block; and applying one or more filter operations to the reconstructed block.

Clause 13D: The method of any of clauses 1D or 3D-12D, wherein the method of decoding is performed as part of a process of encoding the current block of video data.

Clause 14D: A device for decoding video data, the device comprising: a memory configured to store video data; one or more processors implemented in circuitry and configured to: determine a reference block for a current block of a current picture of video data, wherein the reference block is in the current picture; determine a prediction block based on the reference block; determine whether to apply filtering to the prediction block; based on determining that the filtering is to be applied to the prediction block: compare a template of the reference block to a template of the current block; filter the prediction block based on the comparing of the template of the reference block to the template of the current block to determine a filtered prediction block; decode the current block based on the filtered prediction block to determine a decoded version of the current block; and output a decoded picture of the video data comprising the decoded version of the current block.

Clause 15D: The device of clause 14D, wherein to determine whether to apply the filtering to the prediction block, the one or more processors are further configured to receive a flag, wherein a first value for the flag indicates that an intra block copy with filtering mode is enabled and a second value for the flag indicates that the intra block copy with filtering mode is disabled.

Clause 16D: The device of clause 14D or 15D, wherein: to determine whether to apply the filtering to the prediction block, the one or more processors are further configured to determine a size for the current block; and to determine that the filtering is to be applied to the prediction block, the one or more processors are further configured to determine that the size is greater than a threshold size.

Clause 17D: The device of any of clauses 14D-16D, wherein the template of the reference block comprises padded samples.

Clause 18D: The device of any of clauses 14D-17D, wherein: to determine the prediction block for the current block of the current picture of video data, the one or more processors are further configured to determine a block vector for the current block based on a candidate selected from a merge list; and to determine whether to apply the filtering to the prediction block, the one or more processors are further configured to determine whether a prediction block corresponding to the candidate was determined with the filtering.

Clause 19D: The device of any of clauses 14D-18D, wherein to determine whether to apply the filtering to the prediction block comprises, the one or more processors are further configured to determine whether to apply the filtering to the prediction block based on a slice type for the current block being an intra slice.

Clause 20D: The device of any of clauses 14D-19D, wherein to filter the prediction block based on the comparing of the template of the reference block to the template of the current block to determine a filtered prediction block, the one or more processors are further configured to: determine a filter that minimizes a difference between sample values of the template of the reference block and sample values of the template of the current block; and filter the prediction block with the determined filter.

Clause 21D: The device of clause 20D, wherein to determine the filter that minimizes the difference between sample values of the template of the reference block and the sample values of the template of the current block, the one or more processors are further configured to determine a filter that modifies the sample values of the template of the current block to reduce a mean square error between the sample values of the template of the current block and the sample values of the template of the reference block.

Clause 22D: The device of any of clauses 14D-21D, wherein to filter the prediction block based on the comparing of the template of the reference block to the template of the current block to determine a filtered prediction block, the one or more processors are further configured to: determine not to filter the prediction block based on the comparing of the template of the reference block to the template of the current block such that the filtered prediction block is equal to the prediction block.

Clause 23D: The device of any of clauses 14D-22D, wherein the template of the reference block comprises an L-shaped group of samples that includes samples left of a reference block used to determine the prediction block and samples above the reference block, and the template of the current block comprises an L-shaped group of samples that includes the samples left of the current block and samples above the current block.

Clause 24D: The device of any of clauses 14D-23D, wherein to determine the prediction block for the current block of the current picture of video data, the one or more processors are further configured to locate a reference block in a same picture as the current block using a block vector.

Clause 25D: The device of any of clauses 14D-24D, wherein to decode the current block based on the filtered prediction block, the one or more processors are further configured to: add residual data to the filtered prediction block to determine a reconstructed block; and apply one or more filter operations to the reconstructed block.

Clause 26D: The device of any of clauses 14D-25D, further comprising: a display configured to output the decoded picture of the video data.

Clause 27D: The device of any of clauses 14D-26D, further comprising: a camera configured to capture unencoded video data; and wherein the one or more processors are further configured to encode the unencoded video data.

Clause 28D: A computer-readable storage medium storing instructions that when executed by one or more processors cause the one or more processors to: determine a reference block for a current block of a current picture of video data, wherein the reference block is in the current picture; determine a prediction block based on the reference block; determine whether to apply filtering to the prediction block; based on determining that the filtering is to be applied to the prediction block: compare a template of the reference block to a template of the current block; filter the prediction block based on the comparing of the template of the reference block to the template of the current block to determine a filtered prediction block; decode the current block based on the filtered prediction block to determine a decoded version of the current block; and output a decoded picture of the video data comprising the decoded version of the current block.

Clause 29D: A method of encoding video data, the method comprising: determining a reference block for a current block of a current picture of video data, wherein the reference block is in the current picture; determining a prediction block based on the reference block; determining whether to apply filtering to the prediction block; based on determining that the filtering is to be applied to the prediction block: comparing a template of the reference block to a template of the current block; filtering the prediction block based on the comparing of the template of the reference block to the template of the current block to determine a filtered prediction block; decoding the current block based on the filtered prediction block to determine a decoded version of the current block; storing a decoded picture of the video data comprising the decoded version of the current block; and encoding a subsequent block of video data based on the stored decoded picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques may be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following clauses.

What is claimed is:

1. A method of decoding video data, the method comprising:

determining a block vector for a current block of a current picture of video data;

determining a reference block for the current block using the block vector, wherein the reference block is in the current picture;

determining a prediction block based on the reference block;

determining that a local illumination compensation mode is disabled for the current block;

determining to apply filtering to the prediction block in response to determining that the local illumination compensation mode is disabled for the current block;

based on determining that the filtering is to be applied to the prediction block:

comparing a template of the reference block to a template of the current block; and filtering the prediction block based on the comparing of the template of the reference block to the template of the current block to determine a filtered prediction block;

decoding the current block based on the filtered prediction block to determine a decoded version of the current block; and outputting a decoded picture of the video data comprising the decoded version of the current block.

2. The method of claim 1, wherein determining to apply the filtering to the prediction block comprises receiving a flag, wherein a first value for the flag indicates that an intra block copy with filtering mode is enabled and a second value for the flag indicates that the intra block copy with filtering mode is disabled.

3. The method of claim 1, wherein determining to apply the filtering to the prediction block comprises determining a size for the current block and determining that the filtering is to be applied to the prediction block comprises determining that the size is greater than a threshold size.

4. The method of claim 1, wherein the template of the reference block comprises padded samples.

5. The method of claim 1, wherein:

determining prediction block for the current block of the current picture of video data comprises determining the block vector for the current block based on a candidate selected from a merge list; and determining to apply the filtering to the prediction block comprises determining that a prediction block corresponding to the candidate was determined with the filtering.

6. The method of claim 1, wherein determining to apply the filtering to the prediction block comprises determining to apply the filtering to the prediction block based on a slice type for the current block being an intra slice.

7. The method of claim 1, wherein filtering the prediction block based on the comparing of the template of the reference block to the template of the current block to determine a filtered prediction block comprises:

determining a filter that minimizes a difference between sample values of the template of the reference block and sample values of the template of the current block; and filtering the prediction block with the determined filter.

8. The method of claim 7, wherein determining the filter that minimizes the difference between sample values of the template of the reference block and the sample values of the template of the current block comprises determining a filter that modifies the sample values of the template of the current block to reduce a mean square error between the sample values of the template of the current block and the sample values of the template of the reference block.

9. The method of claim 1, wherein filtering the prediction block based on the comparing of the template of the reference block to the template of the current block to determine a filtered prediction block comprises:

determining not to filter the prediction block based on the comparing of the template of the reference block to the template of the current block such that the filtered prediction block is equal to the prediction block.

10. The method of claim 1, wherein the template of the reference block comprises an L-shaped group of samples that includes samples left of a reference block used to determine the prediction block and samples above the reference block, and the template of the current block comprises an L-shaped group of samples that includes the samples left of the current block and samples above the current block.

11. The method of claim 1, wherein decoding the current block based on the filtered prediction block comprises:

adding residual data to the filtered prediction block to determine a reconstructed block; and applying one or more filter operations to the reconstructed block.

12. The method of claim 1, wherein the method of decoding is performed as part of a process of encoding the current block of video data.

13. A device for decoding video data, the device comprising:

a memory configured to store video data;

one or more processors implemented in circuitry and configured to:

determine a block vector for a current block of a current picture of video data;

determine a reference block for the current block using the block vector, wherein the reference block is in the current picture;

determine a prediction block based on the reference block;

determine that a local illumination compensation mode is disabled for the current block;

determine to apply filtering to the prediction block in response to determining that the local illumination compensation mode is disabled for the current block;

based on determining that the filtering is to be applied to the prediction block:

compare a template of the reference block to a template of the current block;

filter the prediction block based on the comparing of the template of the reference block to the template of the current block to determine a filtered prediction block;

decode the current block based on the filtered prediction block to determine a decoded version of the current block; and output a decoded picture of the video data comprising the decoded version of the current block.

14. The device of claim 13, wherein to determine to apply the filtering to the prediction block, the one or more processors are further configured to receive a flag, wherein a first value for the flag indicates that an intra block copy with filtering mode is enabled and a second value for the flag indicates that the intra block copy with filtering mode is disabled.

15. The device of claim 13, wherein:

to determine to apply the filtering to the prediction block, the one or more processors are further configured to determine a size for the current block; and to determine that the filtering is to be applied to the prediction block, the one or more processors are further configured to determine that the size is greater than a threshold size.

16. The device of claim 13, wherein the template of the reference block comprises padded samples.

17. The device of claim 13, wherein:

to determine the prediction block for the current block of the current picture of video data, the one or more processors are further configured to determine the block vector for the current block based on a candidate selected from a merge list; and to determine to apply the filtering to the prediction block, the one or more processors are further configured to determine that a prediction block corresponding to the candidate was determined with the filtering.

18. The device of claim 13, wherein to determine to apply the filtering to the prediction block comprises, the one or more processors are further configured to determine to apply the filtering to the prediction block based on a slice type for the current block being an intra slice.

19. The device of claim 13, wherein to filter the prediction block based on the comparing of the template of the reference block to the template of the current block to determine a filtered prediction block, the one or more processors are further configured to:

determine a filter that minimizes a difference between sample values of the template of the reference block and sample values of the template of the current block; and filter the prediction block with the determined filter.

20. The device of claim 19, wherein to determine the filter that minimizes the difference between sample values of the template of the reference block and the sample values of the template of the current block, the one or more processors are further configured to determine a filter that modifies the sample values of the template of the current block to reduce a mean square error between the sample values of the template of the current block and the sample values of the template of the reference block.

21. The device of claim 13, wherein to filter the prediction block based on the comparing of the template of the reference block to the template of the current block to determine a filtered prediction block, the one or more processors are further configured to:

determine not to filter the prediction block based on the comparing of the template of the reference block to the template of the current block such that the filtered prediction block is equal to the prediction block.

22. The device of claim 13, wherein the template of the reference block comprises an L-shaped group of samples that includes samples left of a reference block used to determine the prediction block and samples above the reference block, and the template of the current block comprises an L-shaped group of samples that includes the samples left of the current block and samples above the current block.

23. The device of claim 13, wherein to decode the current block based on the filtered prediction block, the one or more processors are further configured to:

add residual data to the filtered prediction block to determine a reconstructed block; and apply one or more filter operations to the reconstructed block.

24. The device of claim 13, further comprising:

a display configured to output the decoded picture of the video data.

25. The device of claim 13, further comprising:

a camera configured to capture unencoded video data; and wherein the one or more processors are further configured to encode the unencoded video data.

26. A computer-readable storage medium storing instructions that when executed by one or more processors cause the one or more processors to:

determine a block vector for a current block of a current picture of video data;

determine a reference block for the current block using the block vector, wherein the reference block is in the current picture;

determine a prediction block based on the reference block;

determine that a local illumination compensation mode is disabled for the current block;

determine to apply filtering to the prediction block in response to determining that the local illumination compensation mode is disabled for the current block;

based on determining that the filtering is to be applied to the prediction block:

compare a template of the reference block to a template of the current block;

filter the prediction block based on the comparing of the template of the reference block to the template of the current block to determine a filtered prediction block;

decode the current block based on the filtered prediction block to determine a decoded version of the current block; and output a decoded picture of the video data comprising the decoded version of the current block.

* * * * *